United States Patent [19]
Jones et al.

[11] 3,913,380
[45] Oct. 21, 1975

[54] MONITORING AND BLENDING OF LIQUID FUEL

[75] Inventors: John T. Jones; William C. Ludt; Hudson W. Kellogg, all of Dobbs Ferry, N.Y.

[73] Assignee: Ethyl Corporation, Richmond, Va.

[22] Filed: Sept. 5, 1972

[21] Appl. No.: 286,230

Related U.S. Application Data

[60] Continuation-in-part of Ser. No. 886,458, Dec. 19, 1969, Pat. No. 3,690,851, and a continuation-in-part of Ser. No. 377,192, June 23, 1964, said Ser. No. 886,458, Division of Ser. No. 617,754, Jan. 24, 1967, Pat. No. 3,485,598, which is a continuation-in-part of said Ser. No. 377,192, and Ser. No. 299,583, Aug. 2, 1963, abandoned, and Ser. No. 205,015, June 25, 1962, Pat. No. 3,383,904, said Ser. No. 377,192, continuation-in-part of said Ser. No. 299,583, and said Ser. No. 205,015.

[52] U.S. Cl. .................................................. 73/35
[51] Int. Cl.² ........................................ G01N 33/22
[58] Field of Search ............................. 73/35; 44/2

[56] References Cited
UNITED STATES PATENTS

| | | |
|---|---|---|
| 3,238,765 | 3/1966 | Beal ........................................ 73/35 |
| 3,274,985 | 9/1966 | Traver et al. ........................ 73/35 X |
| 3,312,102 | 4/1967 | Traver ..................................... 73/35 |
| 3,383,904 | 5/1968 | Jones et al. ............................. 73/35 |
| 3,690,851 | 9/1972 | Jones et al. ........................ 73/35 X |

OTHER PUBLICATIONS

ASTM. Manual for Rating Motor Fuels by Motor & Research Methods – 4th Edition, 1960 – pp. 48 & 94.

*Primary Examiner*—James J. Gill

[57] ABSTRACT

Liquid fuels have their knock characteristics monitored by knock test engine operating alternately on the fuel to be tested and on a reference fuel. The difference in knock intensities can be used to control the in-line blending of the test fuel. Test engine has carburetor with fuel-level-determining device to which stream of test fuel is continuously fed faster than required by engine, excess fuel is diverted away from engine by overflow or suction take-off. Fuels can be cooled on way to engine. Compression ratio of knock test engine and/or signal indicator can have automatic adjustment when engine operates on reference fuel so as not to require attention of an operator.

7 Claims, 15 Drawing Figures

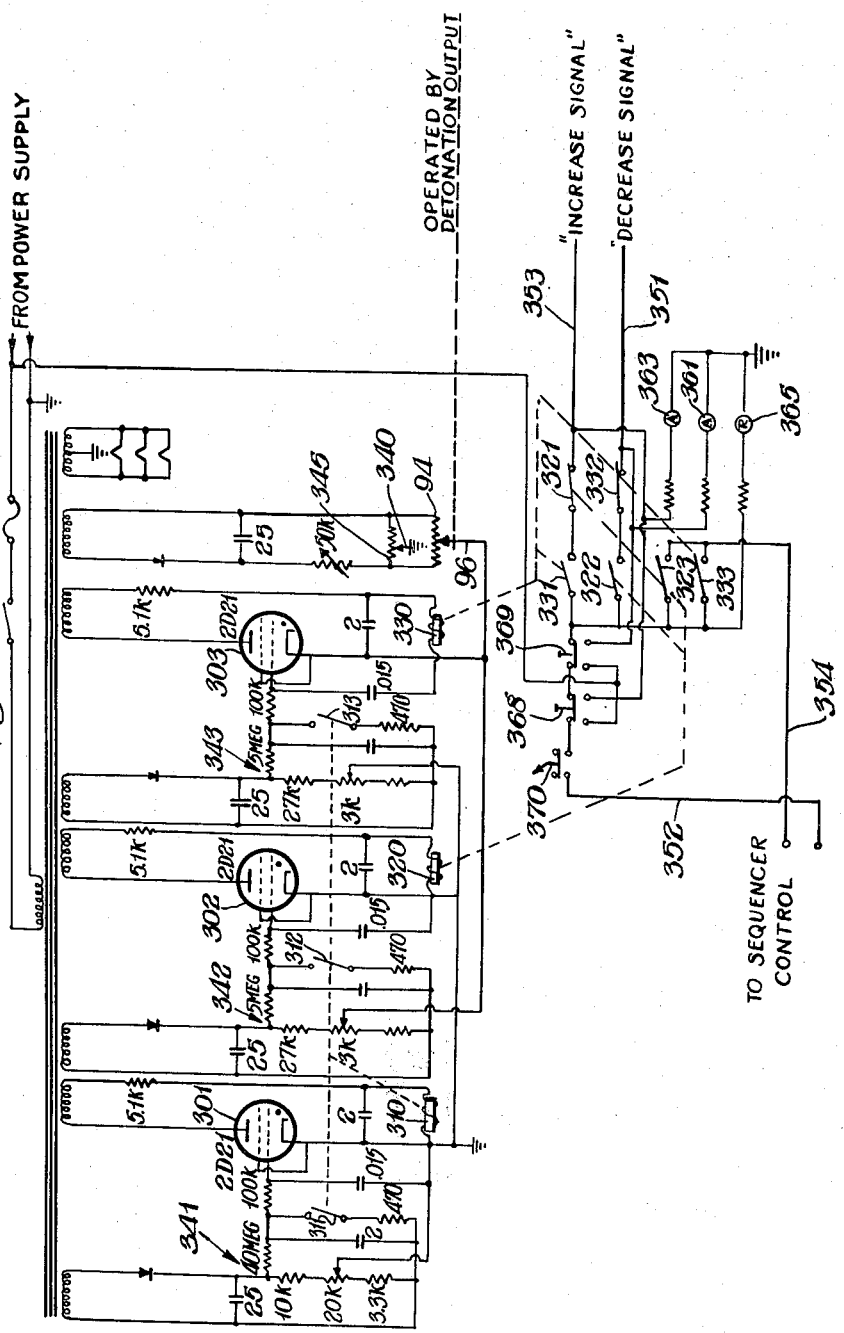

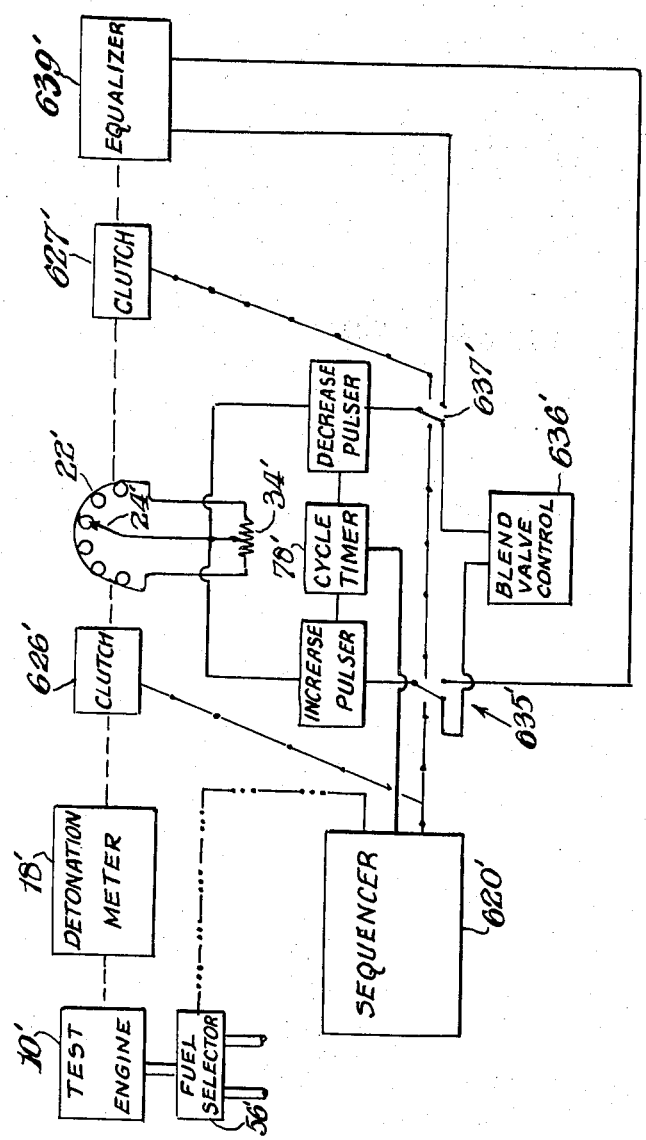

MONITORING AND BLENDING OF LIQUID FUEL

The present application is a continuation-in-part of application Ser. No. 886,458 filed Dec. 19, 1969 (U.S. Pat. No. 3,690,851 granted Sept. 12, 1972) and Ser. No. 377,192 filed June 23, 1964. Application Ser. No. 886,458 is a division of application Ser. No. 617,754 filed Jan. 24, 1967, now U.S. Pat. No. 3,485,598 granted Dec. 23, 1969, which in turn is a continuation-in-part of said Ser. No. 377,192 and of applications Ser. No. 299,583 filed Aug. 2, 1963 (now abandoned); and Ser. No. 205,015 filed June 25, 1962, now U.S. Pat. No. 3,383,904 granted May 21, 1968. Application Ser. No. 377,192 is also in part a continuation of said applications Ser. No. 299,583 and Ser. No. 205,015.

The present invention relates to the measurement and adjustment of antiknock ratings of fuels such as gasoline.

Among the objects of the present invention is the provision of novel methods and apparatus for monitoring the knock characteristics of the above type fuels.

The foregoing as well as additional objects of the present invention will be recognized from the following description of several of its embodiments, reference being made to the accompanying drawings wherein:

FIG. 4 is a circuit diagram of one form of deviation-reducing control for the apparatus of FIGS. 1 and 2;

Figure 3:
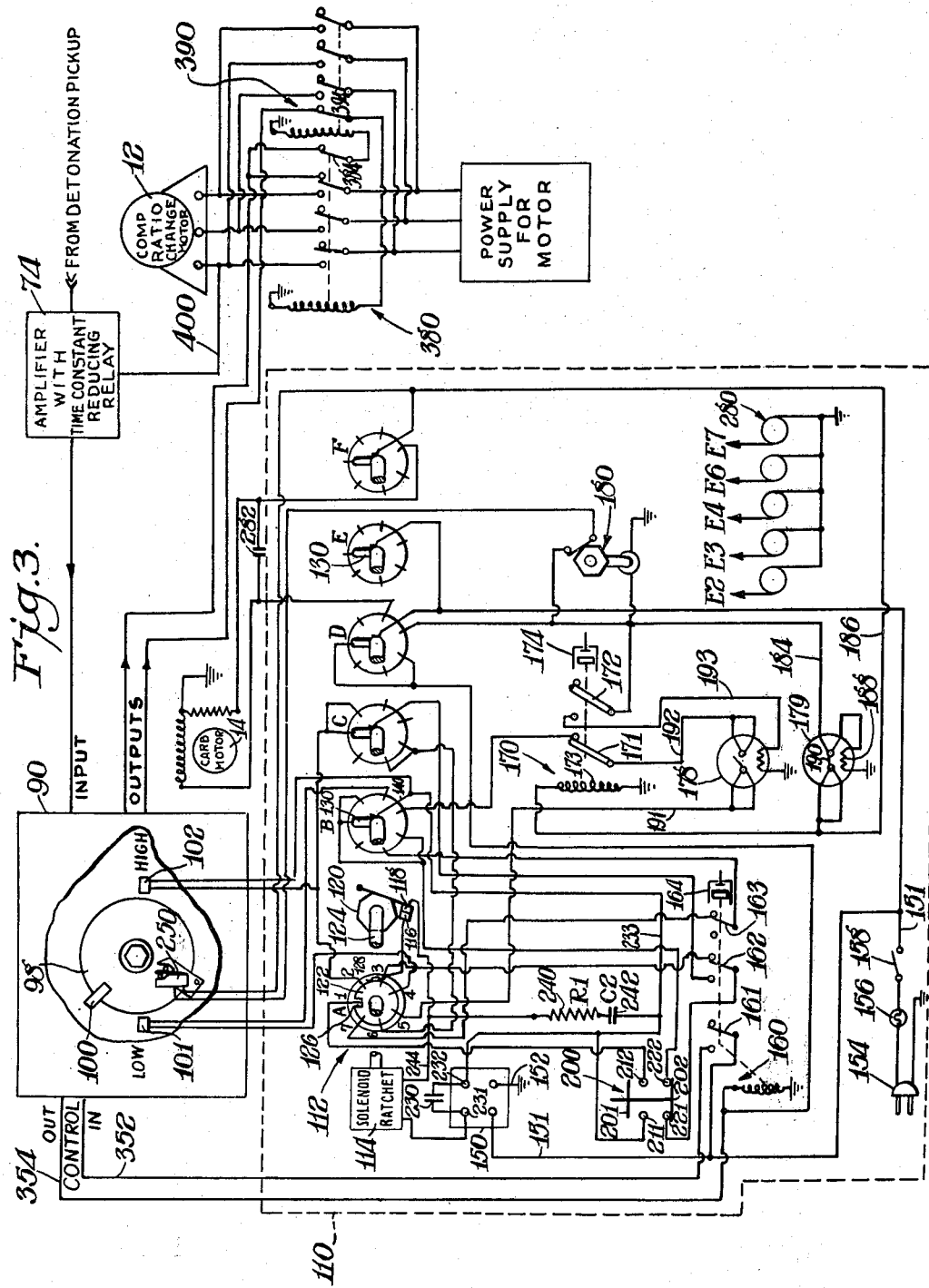
FIG. 3 is a partially schematic more detailed illustration of one form of an assembly of components that cooperate as in FIG. 1, to form an automatic rating apparatus representative of the present invention.
Figure 9:
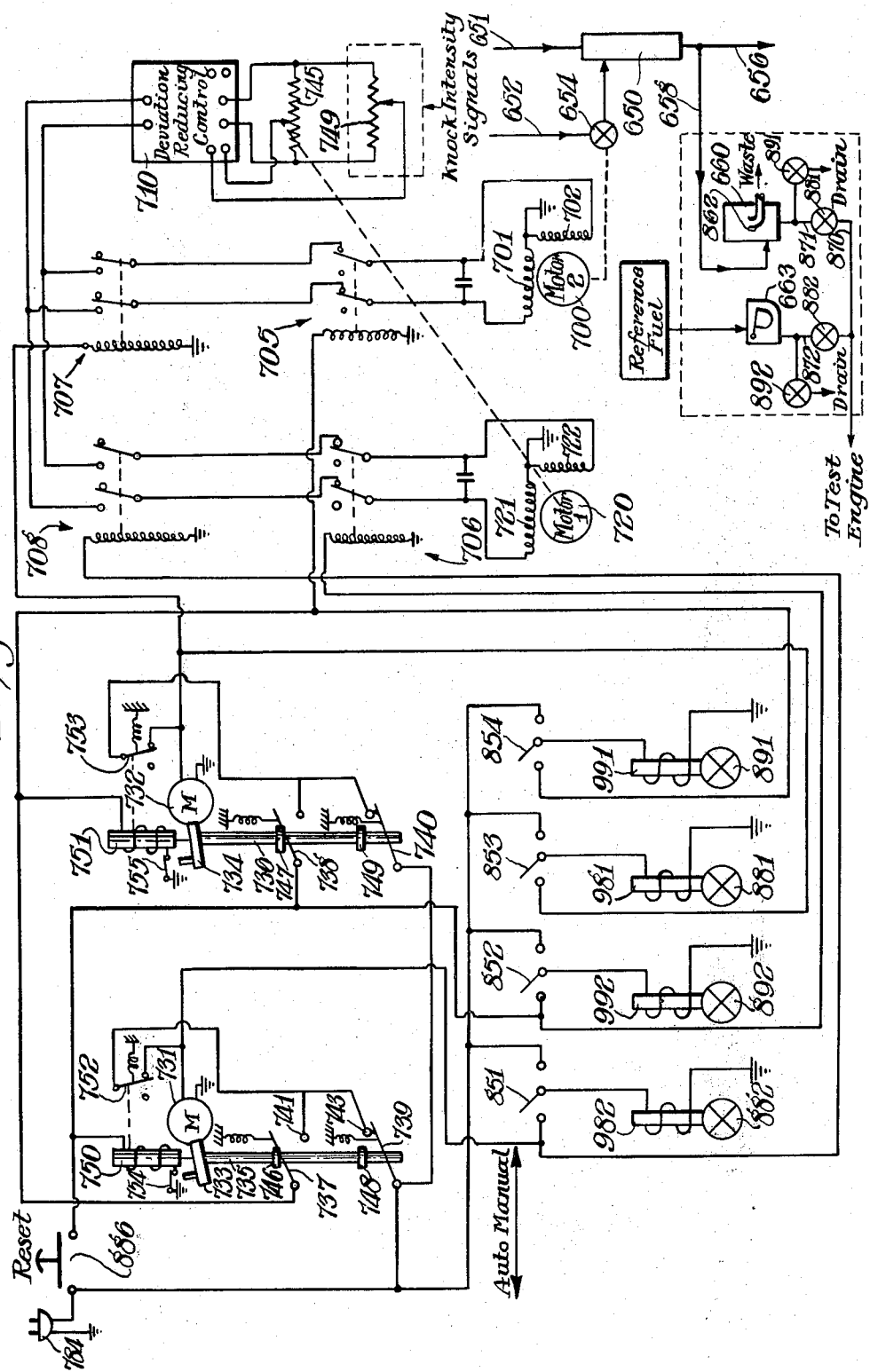
Figure 10:
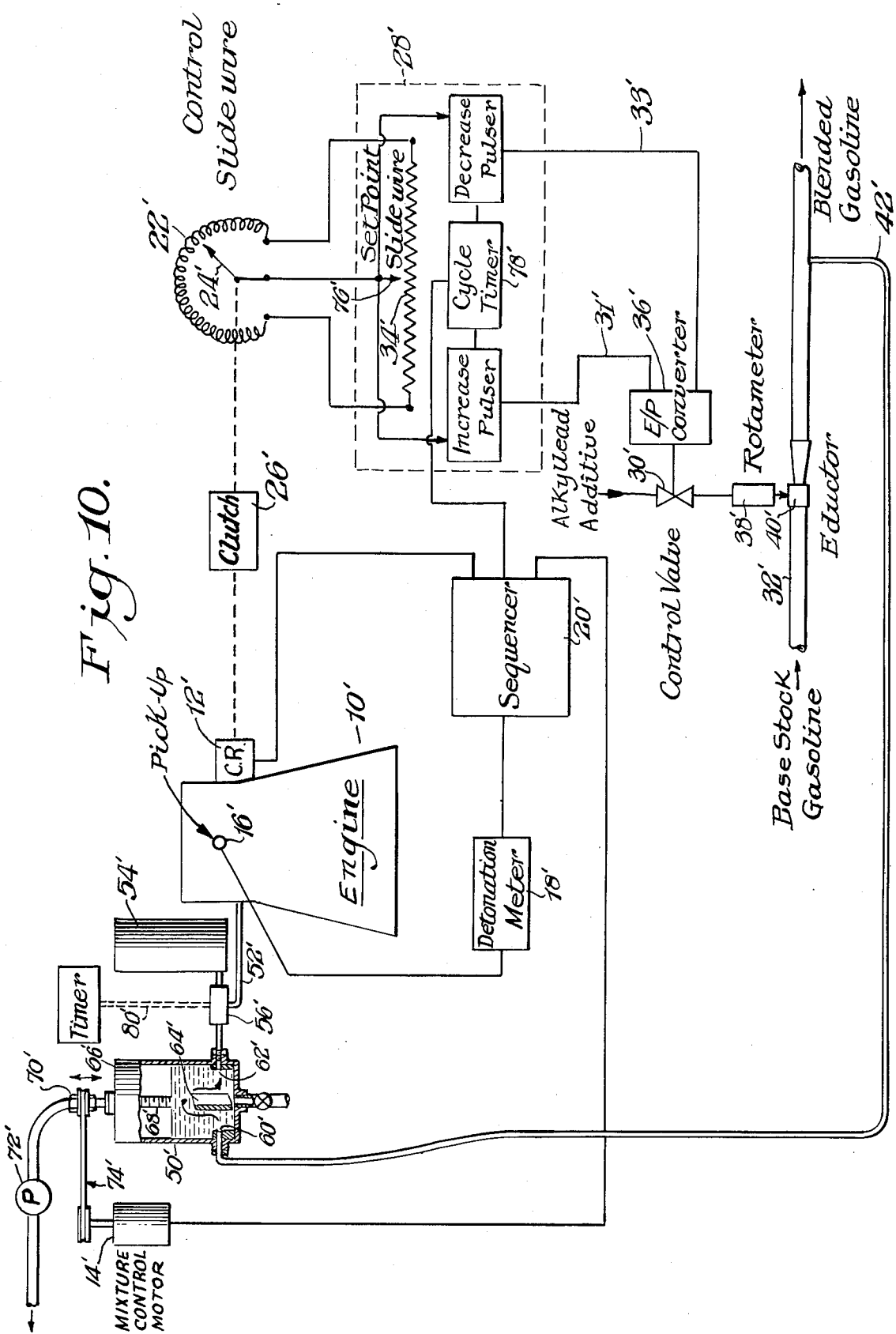
Figure 11:
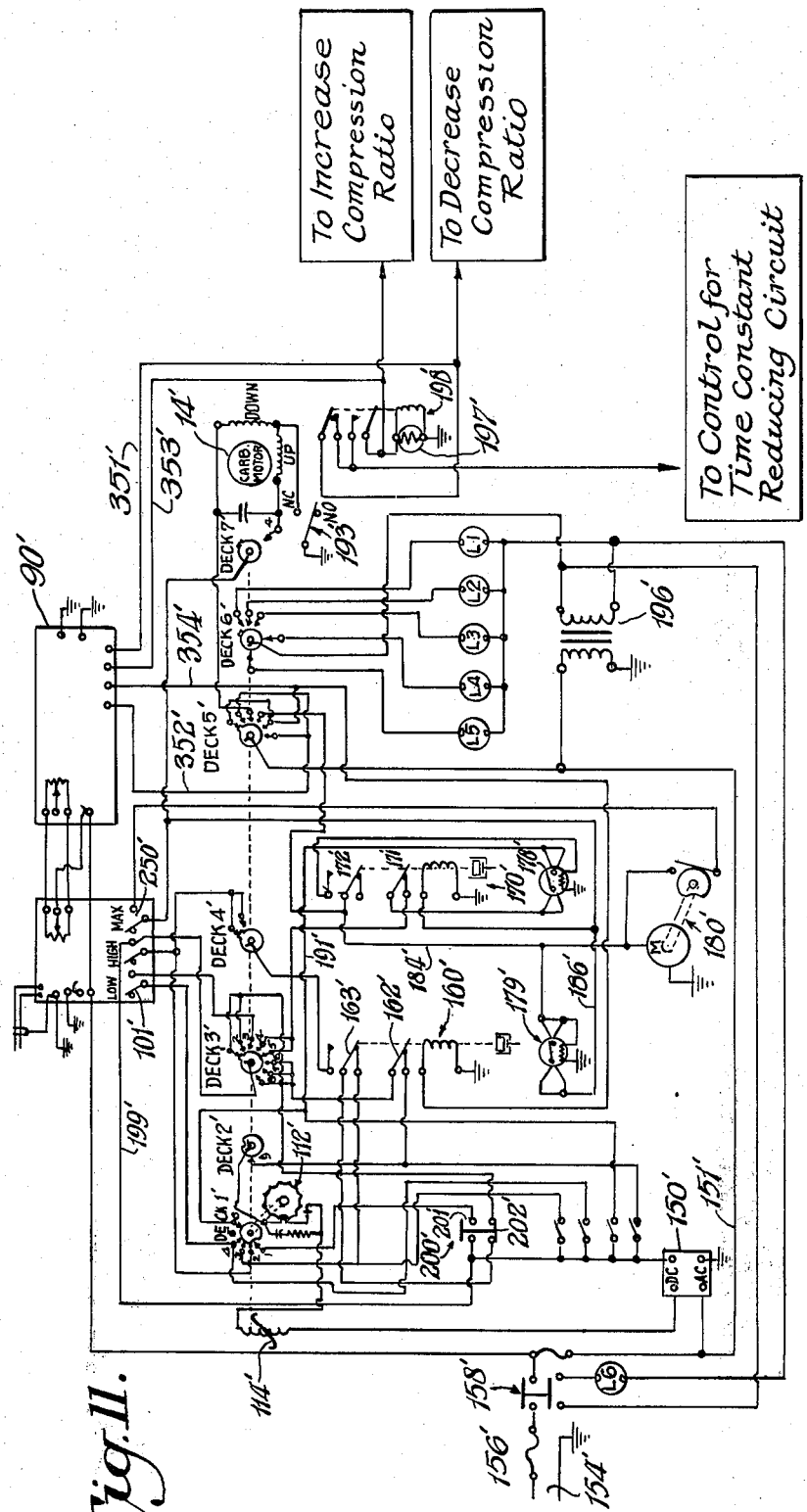

FIG. 9 similarly shows a modified adjusting assembly pursuant to the present invention;

FIG. 10 is a partially schematic representation of further modified fuel adjusting apparatus pursuant to the present invention;

FIG. 11 is a circuit diagram of a modification of the apparatus of FIG. 3; and

FIGS. 12, 13, 14 and 15 are views similar to FIG. 10 of modified forms of automatic antiknock adjustment apparatus typical of the present invention.

According to the present invention an automatic apparatus is provided for monitoring and/or adjusting the knock rating of a fuel stream in a fuel supply system which as in a gasoline refinery. For example the invention can take the form of a blending apparatus for automatically producing a stream of blend fuel that has a substantially uniform antiknock rating, said apparatus including a detonation testing engine, a measuring system connected to indicate the intensity of detonation knocking that takes place in the engine and adjusting mechanism connected for automatically adjusting the compression ratio of the engine to keep the detonation intensity at a predetermined value, sampling means connected to receive samples of blend fuel and deliver them to the engine for combustion therein at maximum knock fuel-air ratio, the sampling means being further connected to deliver to the engine samples of a reference fuel for combustion therein at maximum knock fuel-air ratio, the adjusting mechanism being connected to cause the sampling means to automatically shift from one fuel to the other and back again, and automatic control structure connected to the measuring system to control the blending of the stream so as to have the compression ratio of the engine when operated on the blend fuel at a predetermined value based on the compression ratio when operated on the reference fuel.

The sampling means can be connected to automatically shift the engine to the reference fuel whenever the control action exceeds a predetermined limit. The control structure can directly respond to changes in compression ratio or in detonation intensity.

A feature of the present invention is that it can use a test engine and a detonation measuring system, both of which are standard octane rating items, so that the apparatus provides results that closely conform with standard specifications. Best results are also obtained when a temperature control such as cooling means is included in the apparatus to cool the fuel supplied to the engine or compensate for heating of the fuel caused by the apparatus or other sources.

Additionally, one of the problems of automatic gasoline monitoring or blending is the withdrawal of samples of the gasoline and the prompt supplying of these samples to a test engine at a selectable liquid level or height so as to permit the sample to be accurately carburetted into the engine with very little time delay.

According to the present invention the sampling and leveling is readily accomplished with a relatively small container having an overflow type level-determining device or suction tube projecting into the interior of the container from its upper portion for sucking out excess liquid and thereby defining a level for the liquid in the container.

The suction tube can desirably be threaded through the top of the container and provided with a rotary connection through which it is connected to a suction line while the tube is capable of being rotated and thereby threaded up and down in the container. It is helpful to have a vent opening establishing open communication between the fuel in the container and the outside air if the interior of the container is to be maintained at atmospheric pressure. The vent can be incorporated in the rotary connection as by merely making it a loose fit in the top of the container.

It is also very helpful to have the walls of the container transparent so that the flow of sampling liquid can be readily monitored.

The flow of sampling liquid into the container can be between about 300 and 500 milliliters per minute to provide a liquid at a rate fast enough to rapidly follow the characteristics of the principal stream of liquid being adjusted, without creating so much turbulence in the container as to prevent it from forming an accurate controllable level. To this end the horizontally directed inlet and outlet can be at the very bottom of the container. With this construction the inlet and outlet can be aligned on opposite sides of the container, and if desired a baffle can be interposed to help circulate the incoming liquid through the entire contents of the container before it flows out to the engine.

The apparatus of the present invention is highly suited for automatically monitoring and/or adjusting the octane rating of a fuel stream in a fuel supply system such as in a gasoline refinery. In such an arrangement the automatic knock measuring equipment includes sampling means connected for receiving samples of a fuel stream to be adjusted, and also includes output elements that periodically develop a correction signal corresponding to the difference between the antiknock rating of the sample and a predetermined desired rating. The correction signal can then be used to operate adjusting element such as a mixing valve that controls the amount of high antiknock blending stock to the fuel system, and can adjust the fuel flow in a manner that reduces the magnitude of the correction signal. The high antiknock blending stock can be a refinery stock or it can merely be an antiknock concentrate such as tetraethyl lead with or without scavenger and diluent, or it can be a mixture of refinery stock with antiknock.

For best results the apparatus is arranged to automatically switch the fuel supply to the test engine periodically so that the test engine will operate on a standard or reference fuel sufficiently frequently that any departure in the operation of the engine can be promptly detected and compensated for.

To this end the automatic measuring equipment can have an indicator to show the relative rating of a fuel sample, a standard reference control, means for originally setting the indicator at a predetermined portion of its range, and automatic compensating mechanism connected to periodically cause the measuring equipment to measure the antiknock rating of a standard fuel and to adjust the indicator so that the rating of the standard fuel corresponds with the standard reference control to compensate for drift of the automatic measuring equipment.

Figure 1:
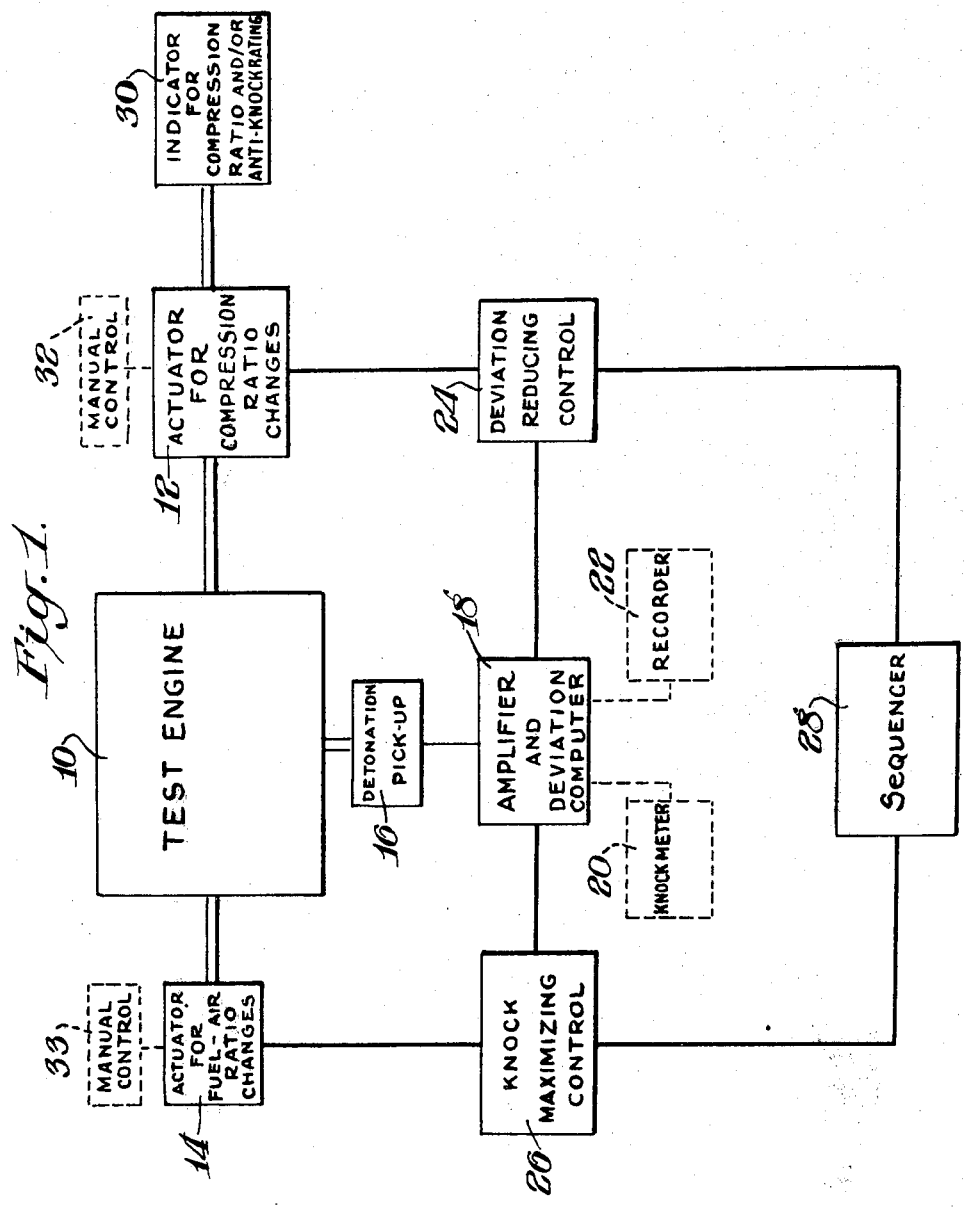
FIG. 1 is a schematic representation of an antiknock rating apparatus according to the present invention.

Referring to the drawings, the apparatus of FIG. 1 includes a test engine indicated at 10 which can be of the standard type such as illustrated and described in the 1960 ASTM Manual for Rating Fuels by Motor and Research Methods, published by the American Society for Testing and Materials, Philadelphia, Penna. Such a conventional engine is equipped with an actuator 12 for changing its compression ratio, which actuator is in the form of a reversible electric motor. The apparatus of FIG. 1 is further provided with a second actuator 14 for changing the fuel-to-air ratio of the combustion mixture supplied to the test engine. Actuator 14 can also be electrically operated as by means of a reversible electric motor.

As in the usual test engine construction, a detonation pick-up 16 is provided so as to develop an electrical signal varying in intensity in accordance with the intensity of the detonation or knock that occurs during the operation of the test engine. In the apparatus of FIG. 1 the signals so produced are delivered to an amplifier and deviation computer 18 which amplifies the signals and also determines how far the detonation or knock varies from some predetermined value. If desired the amplified signal can be displayed on a meter such as the usual knockmeter 20. In addition a recorder 22 may be used to make a record of the signals, either indicative of the degree of knock or of the deviation from the predetermined knock intensity, or both. Recorders of this type are well-known and will make records on circular or rectangular charts, usually with a moving pen actuated by the electric signal being recorded as well as by a timing mechanism that moves the chart.

The automatic testing of the present invention is effected by a combination of a deviation-reducing control 24, a knock-maximizing control 26 and a sequencer 28. The deviation-reducing control 24 is supplied with signals from the deviation computer 18 and is connected to compression ratio change actuator 12 so as to change the compression ratio in the direction which reduces the difference between a pre-set knock intensity and the knock intensity indicated by the detonation pick-up. The knock-maximizing control 26 is supplied with signals from the amplifier 18 or the detonation pick-up 16, and in turn is connected to the fuel-air ratio change actuator 14. Sequencer 28 is connected to operate the two controls 24 and 26 in the appropriate sequence. At the completion of the testing sequence the antiknock rating can be read from an indicator 30 which is conveniently operated by the compression ratio change actuator 12. When operating at the fuel-air ratio for maximum knock intensity, each fuel has one specific compression ratio at which it will produce a standard knock intensity and this compression ratio determines the antiknock rating of that fuel. For ratings up to and including 100, the rating signifies the percentage of iso-octane (2,3,4-trimethylpentane) in a mixture of the iso-octane with normal heptane, which mixture develops the same standard knock intensity under maximum knock conditions at that compression ratio. For fuels having antiknock ratings above 100, the rating similarly represents the compression ratio at which the standard knock intensity is developed under maximum knock conditions by mixtures of iso-octane with tetraethyl lead rather than mixtures of iso-octane with normal heptane.

Indicator 30 can show both the antiknock rating and the corresponding compression ratio, or it can show merely one or the other of these values. Antiknock ratings have a standard relationship to the final compression ratios, as indicated for example in Table V on page 21 of the above Manual.

For convenience in making preliminary or intervening adjustments of compression ratio, the construction of FIG. 1 can include a manual control 32 such as a simple three-position switch for energizing actuator 12 in one direction or the other, or for setting the actuator so that it is controlled only by the deviation-reducing control 24. A similar manual control 33 can be used for fuel-air ratio changes.

Figure 2:
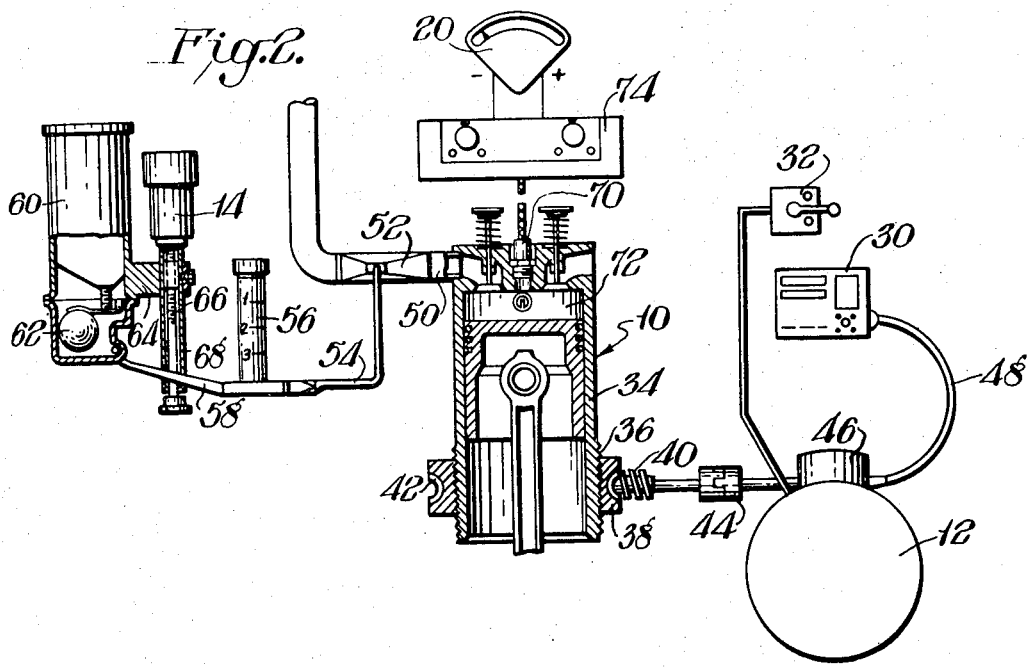
FIG. 2 is a generally diagrammatic view of the mechanical elements suitable for use in the apparatus of FIG. 1, showing a test engine and some of its related structures.

FIG. 2 illustrates the interrelationship between the test engine 10, actuating motor 12 for changing the compression ratio of the engine, and actuating motor 14 for changing the fuel-air ratio. Engine 10 is of the conventional construction with its cylinder 34 movable to and fro along its cylindrical axis. Near the base of the cylinder it is provided with external thread 36 that meshes with internal thread on a rotary nut 38 which is in turn accurately supported so that it does not show any movement in the direction of the cylindrical axis. However, the nut 38 can rotate around that axis and is rotatably driven to and fro in that direction by a worm 40 that meshes with external threads 42 on the nut 38. Worm 40 is in turn driven by the motor 12 as by means of drive coupling 44 and speed reducing gear box 46. Indicator 30 can also be connected to be driven by worm 40 as by means of the flexible drive shaft 48.

The intake line 50 for engine 10 has the usual venturi 52 with a fuel discharge tube 54 leading to and opening in the venturi throat. A fixed fuel level sight glass 56 is shown as in communication with the fuel discharge tube 54 for convenience in reading the height of the fuel level, although such reading is not needed for automatic operation in accordance with the present invention. Flexible conduit 58 connects the fuel discharge tube 54 with a carburetor bowl 60 having a valve-controlling float 62 that determines the level of the fuel in which the float is immersed. The carburetor bowl 60 is provided with an arm 64 containing a vertical passageway that is internally threaded and threadedly engaged on a vertically disposed externally threaded shaft 66 journaled at its ends in a frame 68. One end of the threaded shaft 66 is connected for rotation by motor 14, and the shaft itself is so supported that it cannot move vertically. Frame 68 is also arranged to guide arm 64 so that the arm carries the carburetor bowl upwardly or downwardly, depending upon which way motor 14 rotates, without permitting the arm to tilt or swing. The higher the float controlled fuel level with respect to the venturi 52, the richer the fuel-air ratio of the mixture delivered to intake line 50.

The usual detonation pick-up 70 is mounted in the head or top of the test engine 10 so that the pick-up has its sensing element exposed to the combustion chamber 72 of the engine. The sensing element can be a simple piezoelectric transducer that generates an electrical signal when subjected to pressure or rate of pressure change, and modulates the signal so that it follows the change pressure or in rate of pressure change. Knocking or detonation during engine operation causes development or pressures higher than for normal combustion and rates of pressure change in excess of those for normal combustion, and the electrical signal corresponding to these high pressures or high rates of pressure change can be readily distinguished. An amplifier 74 similar to that ordinarily used, can be arranged to amplify the electrical signals and make them suitable for reading by knockmeter 20. Amplifier 74 corresponds to the amplifier noted in FIG. 1 as an integral portion of unit 18.

FIG. 3 illustrates an automatic octane rating apparatus of the invention in which a deviation computer and portions of a knock maximizing control are combined in a single unit 90 which can also include the deviation reducing control shown in FIG. 4. Unit 90 is built around a recorder such as the ElectroniK 17 strip chart model available from Minneapolis-Honeywell Regulator Company and described in its instruction manual numbered 367001. The recorder has the usual chart that is fed from a supply roll to a take-up roll at a constant speed, and a pen that is traversed across the chart in accordance with variations in electrical signals delivered to an input terminal. These features are well known and since they are not essential parts of the present combination, are not illustrated. The recorder is also equipped with a control slide wire represented at 94 in FIG. 4, that has its wiper or tap 96 moved in accordance with movements of the pen so as to set up a control point having a potential intermediate between that across the ends of this slide wire.

Movement of the pen and tap 96 is effected with the help of pulley 98, and for the purposes of the present invention this pulley is provided with an actuator bar 100 that turns with it and is located so as to close either of a pair of switches 101, 102 when the pulley rotates sufficiently far in either direction. Switch 101 is shown as a low limit switch, and switch 102 as a high limit switch.

Unit 90 is under the control of a sequencer 110 that includes a ganged set of stepping switches 112 driven by a solenoid ratched stepper 114. Six wafer-type switch segments, identified as A, B, C, D, E and F, are in this ganged set along with a set of breaker contacts 116, 118 operated by cam 120. Wafer 112A has a central electrically conductive contact disc 122 rotated by shaft 124 common to all the switch segments, and it has a notch 126 at one portion of its periphery. A wiper or brush contact 128 is fixed and remains in electrical connection with the disc throughout it rotation so as to provide a fixed terminal for electrical connection to that disc. Around the periphery of wafer 112A are seven fixed terminals numbered 1, 2, 3, 4, 5, 6 and 7, each projecting centrally so that they come into wiping engagement with the disc as it rotates. Each terminal is, however, so dimensioned that when notch 126 is brought into opposition to it, the wiping end of the terminal will lie completely within the notch 126 so that terminal becomes disconnected from the disc.

Segments B, C, D, E and F can also be of the wafer type with seven similarly located terminals each, but in each of these a narrow arm 130 is arranged to individually contact one of the terminals at a time as shaft 124 rotates. Arms 130 of each of the segments B, C, D, E, and F are electrically insulated from each other as well as from disc 122, and each has its own fixed wiping contact 140.

Solenoid ratchet 114 is connected for energization by a DC source of current such as rectifier 150 which is shown connected through hot lead 151 and grounded lead 152 to a plug 154 that can be inserted in a conventional 110 volt AC power like receptacle. Fuse 156 and on-off switch 158 can also be included in this circuit.

The sequencer also includes a delay relay generally indicated at 160 for the deviation reducing control and another delay relay 170 for the knock maximizing control. Relay 170 operates in conjunction with an interrupter 180 as well as with delay switches 178 and 179.

Delay relay 160 has three switch armatures 161, 162 and 163 illustrated in the normal position which they take when this relay is not energized. In these positions the armatures engage back contacts. When relay 160 is energized it immediately pulls its armatures over so that they each engage front contacts and this operation is completed without any delay. However, when the relay is deenergized the armatures will be held against their front contacts for a period of about one minute before the armatures are released from their front contacts and permitted to fall back to their back contacts. A dash pot 164 is illustrated as providing the above delay, but any other form of delay mechanism can be used if desired.

Relay 170 is operated in the same manner, a delay dash pot being here represented at 174. A pair of armatures 171, 172 forming part of relay 170 are shown in the normal position they take when this relay is not energized. Winding 173 of relay 170 is energized from either of a pair of parallel leads 184, 186, and in series in lead 184 is the delay switch 179 which is of the normally closed type that stays closed until about twenty seconds or so after power is supplied to lead 184. This type of operation is supplied by means of a heater 188 which forms part of switch 179, in combination with a switch arm 190 of bimetallic nature located so as to be warmed by the heater 188 to the degree required to snap open after the heat has been on for the above period of time.

Switch 178 is of the normally open type, the switch terminals being connected to leads 191, 192, and the heater being separately connected to lead 193.

The sequencer of FIG. 3 also has a reset or start switch 200 with two armatures 201, 202 mechanically biased to the illustrated position as by a spring, not shown. In this position armature 201 is out of engagement with a pair of contacts 211, 212, but armature 202 is in engagement with its two contacts 221, 222.

It is also desirable to connect a capacitor 230 across the DC output terminals 231, 232 of rectifier 150, and to connect a resistor 240 and capacitor 242 in series between terminal 232 and solenoid lead 244 with which terminal 232 is intermittently connected by the switching arrangement.

Pulley 98 of unit 90 has, in addition to the low and high limit switches 101, 102, mechanical maximum sensing elements that include a maximum switch 250 with an actuating nose 252 biased outwardly and holding this switch in open position. Maximum switch 250 (FIG. 5) is fixed on a plate 254 which in turn is pivotally secured to a stationary support 256. Mounting screw 258 passes through an aperture in plate 254 and through a bushing 260, and is threadedly engaged in support 256. This mounting screw arrangement permits plate 254 to pivot and also frictionally engages the plate sufficiently to keep it from pivoting unless it is rotated by a force of sufficient magnitude. A flat or arched spring friction washer 262 can be inserted between bushing 260 and plate 254 or between the head of the mounting screw 258 and plate 254, to improve the frictional engagement.

Figure 5:
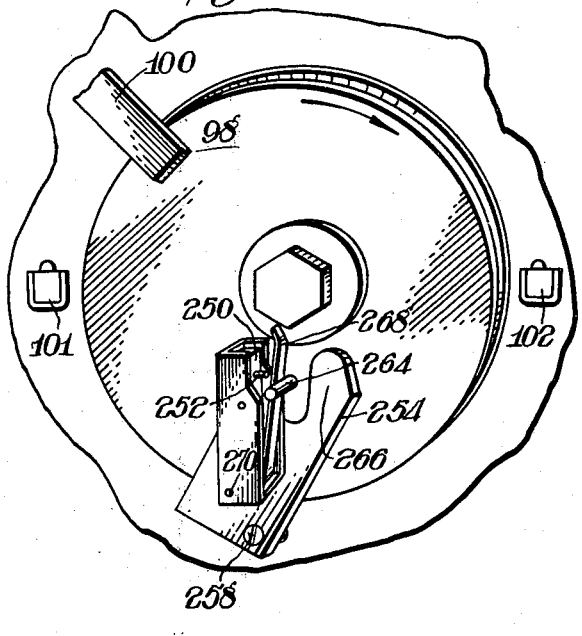
FIG. 5 is an enlarged plan view of one of the controls of FIG. 3.

Pivoting of the plate is effected by a pin 264 secured to the face of the pulley 98 and arranged to engage the switch 250 as the pulley 98 rotates. A cam lobe 266 in plate 254 cooperates with pin 264 to pull the plate in clockwise direction around its mounting screw as seen in FIG. 5, when the pulley 98 rotates an appreciable distance in counterclockwise direction around its pivot. This clockwise pivoting of plate 254 helps bring switch 250 closer to the pin so that the pin will not have as far to travel when it returns from a counterclockwise excursion. Because the tilting of plate 254 can position switch nose 252 at varying distances from the center of pulley 98, an auxiliary contactor 268 can be used to cover nose 252 and provide engagement for pin 264 regardless of the tilt of plate 254. Auxiliary contactor 268 can be journaled on a pivoted bar 270.

Indicator lights 280 can also be used to show the condition of the apparatus, and a capacitor 282 can be connected between the ungrounded ends of the drive windings for motor 14.

The various leads in the sequencer of FIG. 3 are connected as follows:

| | | |
|---|---|---|
| Terminal 1 | of switch segment A to | terminal 212. |
| Terminal 2 | " | terminals 1 and 2 of switch segment C and to first end of high switch 102. |
| Terminal 3 | " | back contact for armature 162. |
| Terminal 4 | " | first end of low switch 101. |
| Terminal 5 | " | lead 191. |
| Terminal 6 | " | terminals 5 and 6 of switch segment C. |
| Terminal 7 | " | back contact for armature 163. |
| Center contact | " | lead 244 (through breaker points 116,118). |
| Terminals 1, 2 & 5 | of switch segment B to | terminal 222. |
| Terminal 3 | " | second end of low switch 101. |
| Terminal 4 | " | back contact for armature 171. |
| Terminal 6 | " | armature 163. |
| Center contact | " | terminal 211 and second end of high switch 102. |
| Center contact | of switch segment C to | front contact for armature 162. |
| Terminals 1 & 5 | of switch segment D to | winding of relay 160. |
| Terminal 3 | " | carburetor motor (lowering connection). |
| Terminal 4 | " | lead 184, armature 172, one terminal of motor of interrupter 180, and one of the interrupter terminals of interrupter 180. |
| Center contacts | of switch segments D & E to | power supply lead 151. |
| Terminals 2,3,4, 6 & 7 | of switch segment E to | indicator lights 280. |
| Terminal 4 | of switch segment F to | carburetor motor (rising connection). |
| Center contact | of switch segment F to | lead 186 and first end of maximum switch 250. |
| Second terminal | of interrupter 180 to | second end of maximum switch 250. |
| Lead 193 | to | front contact for armature 172. |
| Armature 162 | to | terminal 221. |

FIG. 4 illustrates a highly effective form of deviation reducing control similar to that available commercially as Model HP-102 Deviation Proportional Pulse Control Relay of the Minneapolis-Honeywell Regulator Co. As in this commercial model, the control of FIG. 4 has three thyratron tubes 301, 302, and 303 connected with discharge circuits and discharge tripping circuits. Relays 310, 320 and 330 have their windings in series in the respective discharge circuits. Relay 310 has three armatures 311, 312, 313 and simultaneously moves all three to switch-closing position when it is energized by a discharge in thyratron 301. Such discharge is triggered by an adjustable grid circuit 341 and the closing of the grid return circuit through armature 311 shorts out the grid triggering voltage so that the discharge soon terminates.

Meanwhile similar grid triggering circuits 342 and 343 charge up the grids of thyratrons 302 and 303 to their firing voltage, and if the voltage of tap 96 is different from that of tap 340 in a set point slide wire 345, one of these two thyratrons will have its grid voltage raised sufficiently to fire while the other will be lowered a little and will not fire.

Relay 320 is in the discharge circuit of the thyraton that fires when the voltage of the control slide wire tap is too high, and this relay actuates armatures 321, 322 and 323 from their normal positions, which are illustrated, to their actuated positions in which they close a circuit supplying a pulse of power to "decrease" lead 351 from a power supply lead 352. At the same time a similar "increase" signal lead has its open connection further opened to help assure that both increase and decrease signals are not delivered simultaneously.

Conversely, when the relay 330 is energized, it actuates armatures 331, 332 and 333, delivering a pulse of increase signal.

When the potentials of taps 96 and 340 are sufficiently close together, neither the thyratrons 302, 303 fire, and no signal is delivered to line 351 or line 353. In any case, the shunting action of armatures 312, 313 under the actuation of relay 310 resets the firing circuits of thyratrons 302, 303 and prepares them for the next firing trigger.

A feature of the above deviation reducing control is that the correction pulses delivered to line 351 or 353 are longer when the taps 96 and 340 are further apart in potential. As a result the corrections will much more rapidly bring the knock intensity to the standard value as determined by set point tap 340, and will do this with less hunting.

Typical circuit constants for the circuit of FIG. 4 are given in the drawing (capacitances in microfarads and resistances in ohms) and provide very effective results when used with thyratron plate supplies at 270 AC volts and with grid potential supplies at 29 DC volts measured at their rectifier output capacitors. The potentiometer in the grid circuit of thyratron 301 is preferably adjusted to produce a pulse repetition rate of about one per ten seconds, and the potentiometers in the grid circuits of the other thyratrons adjusted so that thyratrons 302 and 303 just barely miss firing when the control slide wire tap has the same potential as the set point slide wire tap and the thyratron 301 fires. To help follow the operation of the circuit, indicator lights 361, 363 are connected in parallel with output leads 351, 353 and one of these will light whenever a correcting pulse is being delivered. Another light 365 is connected to light when power is supplied to lead 352 and is available to pulsing armatures 321, 322, 331 and 332.

Manual control switches 368, 369 of the momentary contact type are also shown as provided to enable manual pulsing of increase and decrease signals. An automatic disabling switch 370, preferably of the on-off type that remains in the position to which it is moved, can also be inserted in lead 352.

The apparatus of FIG. 4 is interconnected in the combination of FIG. 3 by having the power supply lead 352 of FIG. 3 switched on and off through armature 161 of relay 160 in FIG. 3. In addition another interconnection 354 is used to energize relay 160 whenever a correcting pulse of either kind is delivered by the circuit of FIG. 4.

The assembly of FIG. 3 is placed in operation after connection to the appropriate power supplies, by opeating reset switch 200 to bring the sequencer into position 1 (illustrated), after which this switch is released. When the sequencer is in any other position the action of the reset switch in closing a circuit between contacts 211, 212, completes an actuating circuit from rectifier output terminals 231, 232 to the solenoid 114 through disc 122 of switch segment A and its terminal 1. The solenoid will accordingly rotate the selector one step clockwise as seen in FIG. 3. During this step breaker cam 120 opens breaker points 116, 118 until the step is completed. Holding reset switch 200 down will thus assure the stepping until selector reaches position 1 at which time the notch 126 opens the circuit to terminal 1 of segment A and the actuation is terminated.

At the same time segment D of the sequencer as it reaches position 1 completes a connection from power lead 151 through terminal 1 of the segment to the winding of relay 160. This actuates relay 160 which through its armature 161 starts the correction action of the deviation reducing control of FIG. 4. In the meantime the reset switch 200 is released and this completes a supplementary energizing circuit for the solenoid 114 from disc 122 through terminal 2 of segment A, terminal 1 of segment C, center contact of segment C, actuated armature 162, terminals 221, 222 of the reset switch, terminal 1 of segment B, center contact of segment B, lead 223 and terminal 232. This steps the sequencer to position 2 where the bulk of the correction action of the circuit of FIG. 4 is completed. At this position the notch 126 opens the above supplemental energizing circuit to terminal 2 of segment A so that the sequencer remains in position 2.

During the dwell in position 2 the compression ratio of the engine is brought by the deviation reducer of FIG. 4 to the value that produces a detonation signal corresponding to the predetermined standard as set by set-point tap 340. When the correspondence is sufficiently close, the deviation reducer will not develop a correcting pulse in output lead 351 or 353 and as soon as the time delay of relay 160 runs out, the armatures of that relay return to their deenergized position (the one in which they are shown) and this closes a solenoid actuating circuit from disc 122, terminal 3 of switch segment A, armature 162, terminals 221, 222 of reset switch 200, terminal 2 of switch segment B, center contact of switch segment B, and terminal 232. The solenoid accordingly steps to position 3, where the notch 126 again opens the solenoid circuit.

In position 3 the relay 160 remains deenergized but the switch segment D completes a circuit that energizes the carburetor motor 14 and causes it to lower the carburetor. This lowering leans out the fuel mixture and as a result reduces the knock intensity. As the intensity becomes lower, pulley 98 rotates in counterclockwise direction as seen in FIG. 3, and it will soon bring its arm 100 around far enough to close low switch 101. When this happens another solenoid energizing circuit is established from disc 122 through terminal 4 of switch segment A, low switch 101, terminal 3 of switch segment B, center contact of segment B, and terminal 232. This steps the solenoid to position 4 where notch 126 again stops it.

In position 4 the downward rotation of carburetor motor 14 is stopped, and instead switch segments D and F establish an upward rotating energizing circuit for that motor through lead 151, center contact of segment D, terminal 4 of segment D, lead 184, normally closed delay switch 179, lead 186, center contact of segment F and terminal 4 of segment F. The carburetor motor accordingly now raises the carburetor for a few seconds until delay switch 179 open-circuits. This period is preferably about twenty seconds.

As the carburetor is thus raised, the detonation intensity increases and pulley 98 is rotated clockwise bringing its pin 264 against the nose 252 of switch 250, closing this switch. The closing of switch 250 establishes a carburetor raising circuit as a shunt across delay switch 179. This shunt branches off from lead 184 through the contacts of interrupter 180 and the now closed maximum switch 250, and branches back to the center contact of segment F. Accordingly when delay switch 179 times out, the carburetor continues to rise but now does so in an interrupted manner, as for example moving up in 2 to 5 second steps spaced by 5 to 10 second intervals of no movement. This intermittent upward travel of the carburetor is continued as long as it causes the knock intensity to increase and the pulley 98 to move in clockwise direction. When the maximum knock intensity is reached the pulley no longer rotates, and at the next raising of the carburetor the knock intensity diminishes and the pulley 98 makes a very small return step in counterclockwise direction. This withdraws pin 264 from the maximum switch and promptly permits that switch to return to its normally open position, thus stopping further carburetor movement.

In the meantime delay relay 170 was energized through delay switch 179 when the sequencer first reached position 4, and after delay switch 179 open-circuited, this relay continued to be energized through lead 186 each time the carburetor was driven upwards. Until maximum switch 250 opens, the armatures 171, 172 of the delay relay 170 are accordingly held in actuated position. In this position they prepare a step triggering energizing circuit for the solenoid 114, from terminal 4 of switch segment D to terminal 5 of switch segment A. This energizing circuit is kept open initially by normally open delay switch 178, and after that closes as a result of the heating action through actuated armature 172, actuated armature 171 keeps the circuit open. However, when the maximum switch 250 is opened, the relay 170 is no longer energized and it times out, closing the solenoid energizing circuit. The selector thereupon steps to position 5.

In position 5 switch segment D closes a circuit that actuates relay 160 and also supplies energy for the deviation reducer to operate and adjust the compression ratio of the engine. The actuation of armature 161 completes the energizing circuit for the deviation reducer, and at the same time actuation of armature 162 closes a stepping circuit for solenoid 114. This stepping circuit runs from disc 122 through terminal 6 of switch segment A. Terminal 5 of switch segment C, the center contact for switch segment C, armature 162, terminals 221, 222, terminal 5 of switch segment B, the center contact of switch segment B, and terminal 232. The sequencer accordingly promptly steps to position 6, but this does not interfere with the continued operation of the deviation reducer. When relay 160 times out at the end of the new compression ratio search, its arm 163 completes a solenoid stepping circuit that advances the sequencer to position 7. This stepping circuit runs from disc 122 through terminal 7 of switch segment A, armature 163, terminal 6 of switch segment B, the center contact for switch segment B, and terminal 232. In position 7 the measuring cycle is over and the apparatus does not function. It is ready, however, for another measuring cycle which can be initiated by merely operating reset switch 200 for a moment.

The compression ratio developed in step 6 need not be and generally is not the same as the compression ratio reached while the sequencer is in position 2, inasmuch as in position 6 the fuel-air ratio has been brought to maximum knock condition whereas at position 2 no maximum knock fuel-air ratio need have been present. The net result is that in position 6 the compression ratio will be automatically brought to the same value which would be arrived at through the standard A.S.T.M. process for manually measuring antiknock ratings. In fact the automatic process of the present invention can even be considered more accurate in that it eliminates errors that may be inherent in the interpolation which is part of the A.S.T.M. procedure. The maximum knock fuel-air ratio is generally the same when a fuel knocks at standard knock intensity, as when the fuel knocks at other intensities within a significant range above and below standard intensity. It is accordingly unnecessary to go through any more fuel-air adjustment steps after the first.

In some cases, however, the apparatus may be set for one fuel, and then used to test a fuel so greatly different that during the fuel-air adjustment, the operating limits of the apparatus might be exceeded. According to the present invention this is prevented by an automatic recycling arrangement. Thus, if during the lowering of the carburetor the knock intensity increases unduly, indicative of an excessively high initial carburetor position, arm 100 on pulley 98 will be brought into engagement with switch 102 causing that switch to close. This completes a recycle circuit from disc 122 through terminal 2 of switch segment A, high limit switch 102, center contact of switch segment B and terminal 232. This causes the solenoid 114 to ratchet the sequencer around until notch 126 reaches terminal 2, and in passing through position 1 just before this, relay 160 is energized through switch segment D to start another compression ratio search. This new search will end with the fuel-air ratio at a value more suitable for continued automatic adjustment.

Similar recycling also takes place if the knock intensity reaches the same high value during the carburetor raising at sequencer position 4, if this takes place before the maximum knock search is completed. In such a situation the high limit switch 102 is again closed and the same recycling circuit is completed to return the sequencer to position 2 and another compression ratio search.

The same safety recycling will take place whenever the knock intensity becomes excessive, so long as the sequencer is in any position but position 2. Thus should the sequencer even be in the read-out position (position 7) when a very low octane fuel is added to the carburetor, possible damage from excessive knock will be avoided. It is accordingly not necessary to reset the apparatus when the fuels are changed. No automatic recycling is necessary for position 2 inasmuch as in this position the equipment automatically lowers the compression ratio when the knock intensity is too high, and such lowering takes place quite rapidly when the knock intensity is very high.

In the combination of FIG. 3 the compression ratio change motor 12 is operated from the output leads of the deviation reducer by means of relays 380, 390. The motor itself is shown as operated by a three-phase power supply and each relay has three armatures conventionally arranged to interchange the connections to two leads of the three-phase power supply and thereby provide reversible motor actuation. A set of additional armatures 384, 394 included in each relay is series-connected in the energizing circuit for the other relay to thereby reduce the possibility that both relays may inadvertently be operated at the same time. This result is obtained because energizing one relay opens the circuit through which the other must be energized.

Another feature of the present invention is the automatic adjustment of time constant that simplifies and speeds up the use of the apparatus. This is shown more fully in FIG. 7 where a lead 400 from the AC power circuit to compression ratio change motor 12 controls the time constant. This lead is connected through resistor 402 and rectifier 404 to the windings 406 of a relay 410 and then to the ground return. The windings are bridged by a small capacitance 412 to reduce chatter. Relay 410 has an armature 414 connected to the ground return through the windings 426 of a second relay 430. A back contact 416 for armature 414 is connected to armature 434 of relay 430. A front contact 418 for armature 414 is connected through an adjustable resistor 420 in the output of rectifier 404. A back contact 436 for armature 434 is grounded to the power return and a front contact 438 for this armature is connected through a small resistor 450 to the ungrounded end of windings 426. A second armature 440 of relay 430 is connected to the power lead 400 and has a front contact 442 which returns to ground through windings 456 of a third relay 460. A timing capacitor 452 bridged between contact 416 and its armature 414 arranges for the desired energization of relay 460.

When compression ratio change motor 12 is operated, power is supplied through lead 400 and actuates relay 410. This pulls armature 414 away from short-circuiting condition with respect to the timing capacitor 452 and permits the timing capacitor to charge up through resistor 420, front contact 418, armature 414, capacitor 452, armature 434 and back contact 436. After about a second or two of charging; the voltage will build up to the point where windings 426 are energized to trip relay 430 and cause its armature 440 to energize the third relay 460. Armature 434 will rapidly discharge capacitor 452. The three relays will then remain in those respective conditions until the power supply to lead 400 is interrupted, when all three relays 410, 430 and 460 will be deenergized.

Relay 460 adjusts the time constant for the knock measurement response by means of two armatures 461, 462 and a resistor 464. In the deenergized condition of relay 460, as illustrated, armatures 461, 462 merely complete the circuits from an amplifier and rectifier combination 470 through a selectable time constant adjusting resistor switching assembly 480 and through a further DC amplifier 490 so that the final signals can be delivered to the deviation computer. The conventional circuits can be used for units 470, 480 and 490 as in the standard detonation meter, Model 501-A or Model 501-AP. These meters are made available to the industry from the Waukesha Motor Co., Fuel Research Division, Waukesha, Wisconsin. Waukesha Drawing L-6613-C gives the complete wiring diagram for the above components.

Figure 7:
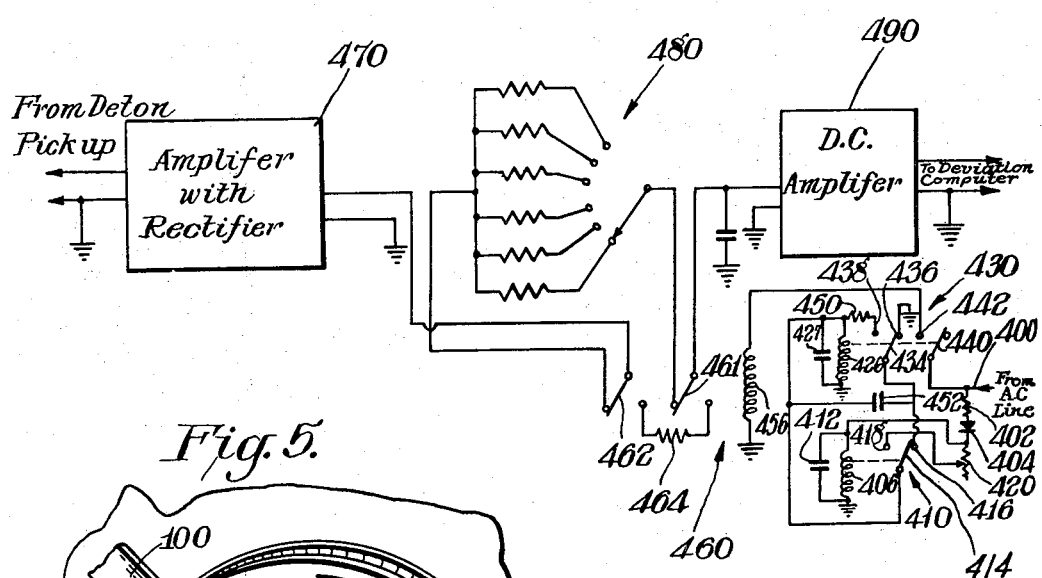
FIG. 7 is a more detailed illustration of an auxiliary unit in the construction of FIG. 3.

In the construction of FIG. 7, relay armatures 461, 462 are arranged so that when relay 460 is energized these armatures by-pass the resistor assembly 480 and connect unit 470 to unit 490 through a separate resistor 464, which can have a resistance corresponding to the lower resistor of assembly 480. With this arrangement the energization of relay 460 will assure that the detonation time constant will be the smallest available regardless of the setting which selector assembly 480 may have.

It will be evident from the above that when a compression ratio search is being conducted and a correcting signal from the deviation reducer is of such long duration that motor 12 much run for more than one or two seconds, relay 460 is actuated and remains so until the motor stops running. This greatly accelerates the response of the signals supplied to the deviation computer from the knockmeter and is of considerable value in speeding up the automatic measurement as well as reducing hunting. Without the automatic time constant reduction the signals at the deviation computer may still be responding to the latest compression ratio change when the next compression ratio change is called for. For very small compression ratio changes, however, a long time constant can be tolerated and is even preferred since it gives a more stable indication of a final knock intensity.

Although many different circuit constants can be used in the timing arrangement for relay 450, the following have shown very good results.

Resistor 402 - 1000 ohms;
Resistor 420 - minimum 2500 ohms, maximum 5000 ohms;
Capacitor 412 - 0.25 microfarads;
Capacitor 452 - 80 microfarads;
Resistor 450 - 100 ohms;
Capacitor 427 - 0.30 microfarads;
Also for the circuit of FIG. 3,
Resistor 240 can be of 10,000 ohms;
Capacitor 242 - 0.10 microfarads;
Capacitor 282 - 0.80 microfarads; and
Capacitor 230 - 0.25 microfarads.

Although control slide wire 94 is shown as part of the combination of FIG. 4, it can be physically located elsewhere and is conveniently a part of unit 90 in FIG. 3. This unit in one practical arrangement is a standard type recorder with a repeater or so-called self-balancing slide wire as in the above-mentioned Minneapolis-Honeywell recorder, or as in U.S. Pat. No. 3,034,125 granted May 8, 1962.

Figure 6:
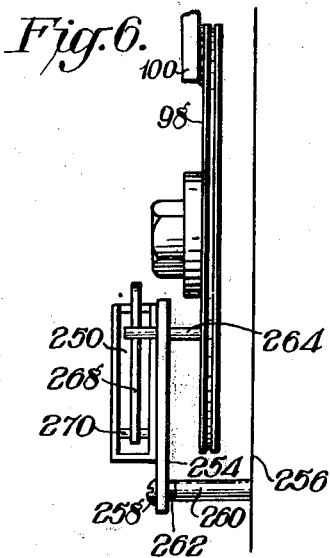
FIG. 6 is a side view of the control of FIG. 5.

The mechanical knock maximizer of FIGS. 4, 5 and 6 can also be operated to stop the maximizing search before the knock intensity signals diminish to any significant degree. For this purpose switch nose 252 can be biased outwardly, that is toward pin 264 by a spring only strong enough to gradually overcome the friction at the mounting pivot 258. With this arrangement rotation of pulley 98 after pin 264 first begins to depress nose 252, will cause the switch to close, after which the nose bias will rotate the switch around pivot 258 between the intermittent rotary steps of pulley 98. Switch 250 will accordingly be closed for only a short period of time at each such step. When the knock intensity reaches a maximum, however, the pulley 98 will not advance and will therefore leave switch 250 open and such open condition can then be used to terminate the knock-maximizing search.

Figure 8:
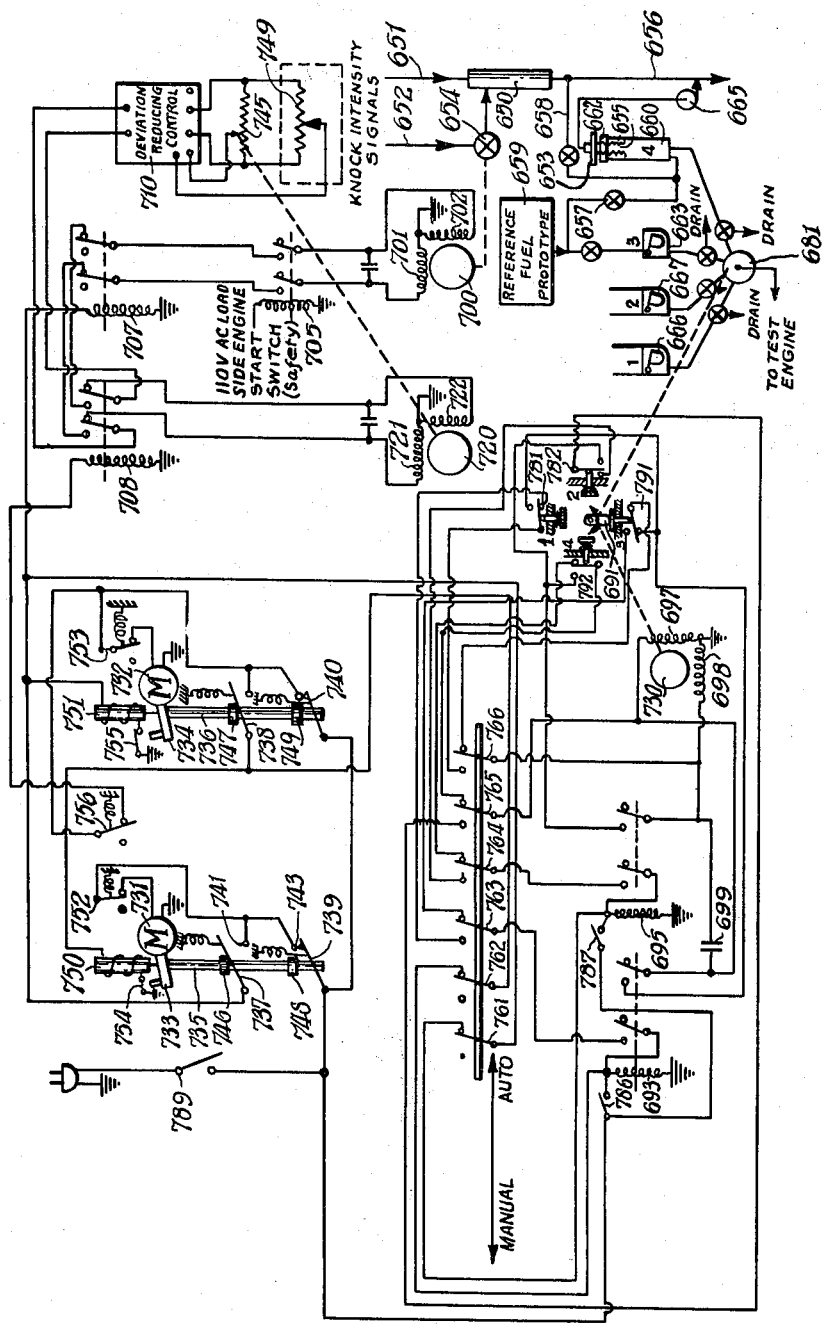
FIG. 8 is a detailed illustration of a fuel adjusting assembly typical of the present invention.

FIG. 8 represents another embodiment of the invention in which a gasoline blending is carried out so as to automatically maintain the finished blend at a pre-set knock value. At 650 is shown a mixing unit which is supplied by a first blending stream through conduit 651 and a second blending stream through conduit 652. A valve 654 in conduit 652 is arranged to vary the rate at which the second stream is fed into the mixing unit. The blending stream in conduit 652 can be a standard antiknock concentrate such as the conventional tetraethyllead with or without scavengers and preferably with a stabilizer that keeps the tetraethyllead from decomposing too rapidly as when it is subjected to elevated temperatures. Other additives such as phosphorus-containing compounds and the like can also be present in the concentrate.

The final blend is withdrawn through conduit 656 and can be supplied to delivery lines, storage tanks, tankers, tank trucks or the like. A small bleed line 658 is branched off conduit 656 and supplies an auxiliary carburetor bowl 660 with a small flow of the final blend. A suction tube 662 in the auxiliary bowl 660 is externally threaded so it can be raised or lowered in bowl 660 as by a manually operated or motor-driven revolving nut 653 so that the lower tip 655 of the tube establishes the fuel level for feeding fuel to the engine carburetor jet assembly. Tube 662 is raised or lowered to establish the fuel level which results in maximum knock intensity. A by-pass valve 657 can be opened to draw fuel into bowl 660 from a source 659 of reference fuel (prototype), if desired. A small positive displacement pump 665 creates a suction in tube 662 so that all fuel in excess of that required by the engine is removed from the upper portion of bowl 660.

Conventional carburetor bowl assemblies 666, 667 and 663 along with auxiliary bowl 660 can supply fuel through separate feed lines that discharge at a rotary carburetor selector valve 681. Selector valve 681 discharges fuel from the selected carburetor reservoir directly to the engine. Bowls 666 and 667 are supplied with the conventional primary reference fuels used in calibrating the engine for octane ratings. Bowl 663 is supplied fuel from reservoir 659, preferably of a prototype reference fuel of constant composition representing the standard against which the blended stream fuel in line 656 is compared. For automatic blend operation, bowls 666 and 667 need not be used.

Blend control valve 654 can be of the usual remotely controlled type operated by an air motor or by an electric motor 700. This motor is of reversible type with separate windings 701, 702 which determine the direction of rotation. The windings are energized through a disabling relay 705 and a control relay 707, by a deviation-reducing control 710 which can be like that of FIG. 4. In the illustrated construction of FIG. 8, the deviation-reducing control 710 includes a set-point slidewire 745 and a control slidewire 749, as in the construction of FIG. 4, with the control slidewire similarly operated in response to the knock intensity signals.

A companion reversible motor 720 similar to motor 700 and also with separate rotation controlling windings 721, 722, is electrically connected for operation by a principal relay 708, and motor 720 is physically connected to operate slidewise 745 to control the setting of its set-point.

A pair of timers and associated secondary relays and switches are connected to energize the above relays and to operate carburetor selector valve 681 through an additional reversible motor 730 which has separate rotation controlling windings 697, 698. Motor 730 also operates switches 781, 782, 791, 792 by rotation of cam 691. A first timer motor 731 includes an arm 733 which it rotates downwardly, as seen in the figure, and which in turn pushes down before it an actuating rod 735 that operates two switch blades 737, 739. Both blades are mechanically biased upwardly, as indicated, so that blade 737 is normally out of engagement with its cooperating contact 741 while blade 739 is in engagement with its cooperating contact 743. Lugs 746 and 748 are arranged on actuating bar 735 so that when the arm 733 moves downwardly, blade 737 engages its contact 741 before blade 739 is pushed away from its contact 743. A solenoid 750 cooperates with arm 733 so that when the solenoid is energized it pulls that arm up to a reset limit which marks the zero point from which timer motor 731 begins operation. Switches 752, 756 each normally closed, are also actuated to open condition by the energization of solenoid 750. Another switch 754 is normally closed but is mechanically forced open when arm 733 returns to the zero point.

A second timing motor 732 is similarly provided with a timing arm 734, actuating rod 736, switch blades 738 and 740, lugs 747 and 749, solenoid 751 and switches 753 and 755.

Switches 761, 762, 763, 764, 765 and 766 of the single pole, double throw variety, are also shown as connected so that by moving these switches to their right-hand positions as shown in FIG. 8, the carburetor bowl motor 730 is connected for automatic operation by relays 693, 695 and the timers 731, 732 to supply the engine fuel from fuel bowl 663 or from auxiliary bowl 660 as needed. In their left-hand positions switches 761 through 766 place the selector motor 730 under the sole control of switches 786, 787 to select fuel from carburetors 666 or 667 as desired. The direction in which motor 730 then operates is determined by switches 786, 787.

Operation of the device as a gasoline stream control is effected by positioning switches 761 through 766 to their right-hand positions as shown in FIG. 8. Closing of the master switch 789 sets the device in operation. Timers 731, 732 must be positioned manually for the initial step. Such switch closing also serves to rotate motor 730 to bring selector switch 681 to the proper carburetor bowl. With timer 731 reset and timer 732 in the timed-out position, the deviation reducing control 710 delivers correcting impulses as needed to carry the set-point of slidewire 745 to a position representative of the antiknock rating of the reference fuel (prototype). These corrective impulses are delivered through the normally open contacts of relay 708 to motor 720 and are not permitted to go to motor 700.

The timing run of motor 731 can be arbitrarily arranged to occupy a period which is adequate for the slidewire 745 to reach its setting. As timing motor 731 approaches the end of this timing run, it first closes switch 737, thereby energizing solenoid 751, relay 707 and relay 695.

Solenoid 751 resets timing motor 732 and temporarily opens switch 753. Relay 707 when energized, opens its armatures without delay, but when deenergized times out through a short delay before reclosing its armatures. This temporarily prevents pulses from deviation reducing control 710 reaching motor 700. Relay 695 supplies power through switches 764, 792, 765 to winding 697 of selector motor 730. This power also charges condenser 699. Motor 730 will operate cam 691 and the carburetor selector valve 681, rotating them until cam 691 actuates switch 792, stopping the flow of motor-energizing current. When switch 792 is so actuated it also closes an auxiliary circuit that permits discharge of condenser 699 to the winding 698 which acts as a brake on motor 730, causing rotation of cam 691 to stop more rapidly. Carburetor selector valve 681 will have thus been positioned on bowl 660 which can then supply fuel to the test engine. By this time timing motor 731 has gone a little further and opened switch 739 so that motor 731 is stopped. The current to solenoid 751, relay 707 and relay 695 is also stopped by then, and switch 753 accordingly closes. Motor 732 then begins to time out by power supplied through switches 740 and 753. This power also passes through switch 756 to relay 708, which in its actuated position permits deviation reducing control 710 to send correcting impulses to motor 700 through the armatures of delay relay 707 (after it has timed out) and through the armatures of relay 705. Relay 705 is arranged to be always actuated whenever the test engine is running, and acts as a safety to assure keeping valve 654 in its last position should the test engine stop.

During the timing run of timer 732, the signals from the deviation reducing control operate valve 654 and adjust the blending flow from line 652 to the degree required to bring slide-wire 749 in balance with slidewire 745. As timer motor 732 approaches the end of its run it first closes switch 738, energizing solenoid 750 to reset timer motor 731 and open switches 752 and 756. It also actuates relay 693 so that motor 730 will be operated by means of an energizing circuit through switches 763, 791, 766 to winding 698 of motor 730, at the same time charging condenser 699. The stopping of motor 730 and cam 691 along with carburetor selector valve 681 then takes place in a manner similar to that described above so that the engine will now operate on prototype fuel through bowl 663.

The reason for opening switch 756 when timer 731 is reset is to deactivate relay 708 so that any impulse from deviation reducing control 710 that might occur after the engine has ceased to operate on stream fuel from bowl 660 will not reposition valve 654.

The above alternate timing steps are then repeated indefinitely and will adjust the blending to the desired antiknock setting.

The suction tube arrangement of FIG. 8 used to maintain the fuel level in carburetor bowl 660 is particularly desirable in that it is simple to construct and operate, yet it gives very accurate results. The excess fuel can be sucked from the bowl at a very rapid rate and a rapid fuel flow can accordingly be used so that changes in the fuel are very rapidly detected notwithstanding the low fuel consumption of the test engine itself.

If it is desired to operate the engine on primary reference fuels or other fuels through bowls 666 and 667, all of the switches 761 through 766 are positioned to their left-hand condition at which time motor 730, cam 691 and carburetor selector valve 681 can be positioned by actuation of switches 786 or 787 to operate the engine on these particular fuels.

Instead of using a rotary selector valve for selecting a fuel supply, other types of arrangements can be made. FIG. 9 shows an arrangement in which separate valves are used with the individual carburetor bowls, and are suitably actuated to effect the desired operation. This figure has one carburetor bowl 660 for the fuel to be tested and another carburetor bowl 663 for a reference fuel, an overflow 862 being provided for carburetor bowl 660.

Each carburetor bowl supplies a feed line 871, 872 that discharges to the engine intake 870. Electrically operated valves 881, 882 in the bowl outflow lines 871, 872 are arranged to automatically select fuel from the individual bowls. In addition secondary valves 891, 892 can be connected to lines 871, 872 so as to drain the respective bowls. Bowl 663 can be kept supplied by a reference fuel of constant composition.

The construction of FIG. 9 operates in a manner analogous to that of FIG. 8, and similar parts are similarly numbered. A set of control switches 851, 852, 853, 854 can be set for automatic or manual operation as shown to actuate individual solenoids 982, 992, 981, 991 for the respective valves 882, 892, 881, 891, and a start switch 886 is provided that also resets timer 731.

Closing of the reset switch 886 sets the device in operation by energizing solenoid 750 along with solenoid 992 and relay 706. (All switches 851, 852, 853 and 854 are first placed in their automatic or left-hand circuit-closing positions.) The energization of solenoid 750 pulls timer arm 733 back to the zero position, thus deenergizing itself by the opening of switch 754. During the time solenoid 750 is energized it also opens switch 752, thus keeping timer motor 731 from operating. When solenoid 750 deenergizes itself it permits switch 750 to close, completing an energizing circuit for timer motor 731 through switch 739. This motor-energizing circuit also actuates solenoid 982 to hold valve 882 open. In the meantime reset switch 886 has been released so that solenoid 992 (along with relay 706) has become deenergized, permitting valve 892 to close. Accordingly carburetor bowl 663 which had been drained through valve 892 while it was open, is now permitted to feed fuel through valve 882 which is opened to the test engine when timer motor 731 starts running. During this operation of the test engine deviation reducing control 710 delivers correcting impulses as needed to carry the setpoint of slidewire 745 to a position representative of the antiknock rating of the reference fuel (prototype). Relay 708 is energized so that the correcting impulses are delivered to motor 720 and not to motor 700.

The timing run of motor 731 can be arbitrarily set at a period which is adequate for the slidewire 745 to reach its setting. As timing motor 731 approaches the end of this timing run it first closes switch 737, thereby energizing solenoids 751 and 991 as well as disabling relay 705. Solenoid 751 thereupon resets timing motor 732 while solenoid 991 opens the drain for bowl 660. Solenoid 751 is promptly locked out by the return of timing arm 734 to zero position, and timing motor 732 then begins its run. By this time timing motor 731 has gone a little further and opened switch 739 so that it is stopped, valve 882 is closed and relay 708 is deenergized.

At the commencement of timer motor 732, valve 881 is opened and relay 707 is energized. The test engine is accordingly switched to fuel from bowl 660 while further deviation reducing signals from control 710 are delivered to motor 700 rather than motor 720. Such signals will now operate valve 654 and adjust the blending flow from line 652 to the degree required to bring slidewire 749 in balance with slidewire 745.

As timer motor 732 approaches the end of its run it first closes switch 738 which resets timer motor 731 and opens drain valve 892. A little later timer motor 732 opens switch 740 thereby reaching the end of its run and completing the switchover to the reference fuel.

The above alternate timing steps are then repeated indefinitely and will adjust the blending to the desired antiknock setting. Relays 705 and 706 can be of the type that when energized, immediately open their switches but only permit the switches to close after some delay. This time delay can be arranged to span the transition period while the fuel shifting is being accomplished up to the time when the new fuel has stabilized itself in the engine intake system.

The apparatus of FIG. 8 (or FIG. 9) can be used with a knock maximizing control and appropriate sequencer where absolute knock values are to be attained. In such event, an automatic or manual check can be made of the set-point of slide-wire 745 to make sure that it is correctly positioned for the reference fuel. If it is incorrect then the apparatus needs adjustment, generally to compensate for the drift normally experienced with test engines as they operate. The resetting of the set points off slidewire 745 by such an automatic or manual check is sufficient compensation in itself, where the resetting is of small extent.

The apparatus of FIG. 8 (or FIG. 9) can also be used to merely check compression ratios with or without a check of fuel-air ratios. To this end the signals delivered to the slidewires 745 and 749 can correspond to the height of the test engine cylinder in its compression ratio adjustment travel, and can be obtained from a differential transformer having a core movable with respect to windings, and coupled to the engine so as to move with the compression ratio adjustment. The windings will show a mutual inductance that varies with the height of the core, and thus will deliver a signal representative of the compression ratio. The set point of slidewire 745 can also be displaced from the position represented by the compression ratio, as by adding to or subtracting from the compression ratio signal a value corresponding to a difference that is to be maintained between the fuel being monitored or blended and a reference fuel. This enables the monitoring or blending to be conveniently carried out with a reference fuel which is not a target fuel but has an antiknock value somewhat off the target value. It is preferred in such a modification to have the compression ratio signals delivered through a spanning potentiometer having a uniform electrical taper so that a specified degree of potentiometer adjustment represents the same antiknock difference everywhere along the potentiometer. A fixed signal similarly adjusted can then be readily added to or subtracted from the output of the spanning potentiometer to provide accurately adjustable operation.

The reference fuel used can be a preformed sample of blend from line 656. When the blending ingredient fed through line 652 is added in only small proportions, as for example when it is the above-mentioned antiknock concentrate, it does not significantly affect the fuel-air ratio required for the final blend to exhibit its maximum knock, and the preformed batch of reference fuel will have substantially the same maximum knock fuel-air ratio regardless of the blending proportions. At the very first timing run the apparatus can be set for that ratio either manually or automatically, and for each timing run after that it is sufficient merely to adjust the blend so that it requires the same compression ratio as the reference fuel (prototype) to reach the same knock intensity. Because no draining of the reference fuel is needed with such an arrangement, as pointed out above, the total quantity of reference fuel needed can be relatively small for a blending operation of long duration. Further decreases in the amount of reference fuel needed can be arranged by adjusting the timer so that two or more final blend tests are made after every reference fuel test.

It is helpful to have sampling line 658 as short as convenient to minimize the flow rate required through it in order for the fuel in bowl 660 to match that in line 656. At the same time the connection from the sampling line 658 to outflow line 656 can be placed down-stream of valve 654 close to the mixing unit 650 so that automatic blending adjustments are promptly detected.

Where the streams fed through lines 651 and 652 are streams of different refinery products such that varying mixtures of them will show maximum knock at different fuel-air ratios, the apparatus of FIG. 8 (or FIG. 9) can be expanded to include the entire test assembly of FIG. 3 with the sequencer automatically reset by the timer motors 731, 732. Also the carburetor bowls 660 and 663 can in this arrangement have their heights separately adjustable so that the adjustment of one to maximum knock will not affect the adjustment of the other.

One highly practical arrangement is to have the automatic fuel-air ratio adjustment connected to automatically go through one such adjustment when a blending control is initiated, the blending control then continuing indefinitely with only the compression ratio or the knock intensity automatically controlling the blending. In the event of a process upset or other significant change in any of the refinery streams fed to the blender, there is ample notice and the blending control apparatus can be manually or automatically re-initiated so that another fuel-air ratio search is effected. If desired the apparatus can be arranged to go through two fuel-air ratio searches when it is placed in operation, one such search for the blend fuel and the other such search for the reference or prototype fuel. During the remainder of the blending control, which can extend for many days, the apparatus can merely control the blending to keep the compression ratio at the desired level when the engine is operating on the blend fuel, with an occasional shift to the reference or prototype fuel to check on the desired compression ratio level.

It may also be desired to apply a positive temperature control to the fuel fed to the test engine, as for example to compensate for heating by the valve solenoids 881, 882, 891 and 892 (FIG. 9). The continuous operation of one of these solenoids usually generates appreciable heat. The fuel lines adjacent these solenoids, or the solenoids themselves, may accordingly be jacketed with liquid flow passages through which is circulated a cooling liquid such as water or overflow fuel. Cooling is also helpful to reduce evaporation of the lighter fractions of the fuels and the measuring errors that can thus result. A small refrigerating unit is particularly helpful and can keep the fuels supplied at a substantially constant low temperature. The motor-driven rotary selector valve of FIG. 8 does not need cooling.

The reading of the control slidewire 749 with or without that of slidewire 745, can be shown in a display window as described above in connection with FIG. 2, or it can be printed out, photographed, or recorded as by continuous or intermittent recording. It can also be transmitted to remote locations for monitoring purposes. Analog or digital forms of the readings can be used for such transmission, and if desired digital forms can even be used for the control operations.

The sequencers of the present invention provide for each control function or step to go to completion regardless of the time required for moving to the next position and control function. Also at each step the switching action will take place without unnecessarily extending the time required for a given control function. Different fuels or gasolines react at different rates to changes in compression ratio and/or fuel-air ratio, and the sequencers of the present invention make the various adjustments as quickly, if not more quickly, than is possible manually.

The sequencer of FIG. 3 can also be connected to a fuel selector shift mechanism that shifts the supply of fuel to the engine 10 from one source to another, as for example by having a separate bowl and float valve combination for each source. One convenient form of shift mechanism includes a multi-position rotating plug selector valve linked to a stepping solenoid and arranged so that when the sequencer reaches position 7 it delivers a pulse of current to the solenoid and causes the valve to step around a circular path. At each step the selector valve closes one supply line and opens another. Six or eight steps or more can be provided in this circular path before the valve returns to its original position so that a corresponding number of fuels can be selected automatically. One or more of the fuels can be a reference fuel having a known antiknock rating so that the operation of the equipment can be checked.

It is a feature of the present invention that because the apparatus will operate automatically, it can in any measurement be arranged to go through as many sequences as necessary to reach a standard knock intensity as accurately as desired. By increasing the accuracy of this procedure, the need for comparison with standard fuels is greatly diminished. Occasional comparisons of this type will still be desirable in order to indicate when the engine or other components have drifted away from the desired operating characteristics and need correction or maintenance. Setting the high limit switch just above but close to the standard knock intensity position will materially increase the accuracy.

As discussed above, very good automatic knock measurement is obtained with the compression ratio correction pulses that increase in length as the knock intensity signals depart further from the desired standard. An exactly proportional variation between the correction pulse length and the departure from standard, so that doubling the departure doubles the pulse length, is highly effective but the pulses can increase in length faster or slower than this. It is preferred, however, that the pulse length increase at least about 10% as fast as the signal departures from standard, and that they increase no more than about twice as fast as the departures, inasmuch as this range provides most rapid automatic operation with little or no hunting and with signal intensity checks made as frequently as one per ten seconds. Other checking frequencies can also be used to advantage, particularly with the higher rates of pulse length variation as compared to signal strength changes.

Carburetor level raising is best accomplished in small steps about 5 to 10 seconds apart and preferably about 8 seconds apart, although the steps can be as little as one tenth millimeter and as much as five tenths millimeter each. The length of time taken for each step should be held to the minimum, preferably not over two seconds.

The above conditions apply both to the antiknock testing as with the apparatus of FIG. 3, as well as to the simpler compression ratio adjustment desired as a preliminary step to use of the apparatus illustrated in FIG. 8.

The apparatus of FIG. 8 (or FIG. 9) can also be arranged to control the operation of refinery units such as alkylation, platforming, hydroforming, reforming, catalytic cracking, etc., instead of blending. By connecting motor 700 so that it adjusts the critical controls to such apparatuses in accordance with the test measurements, they can be positioned to produce fuel stocks of the required antiknock quality. When making a test on a fuel, it is helpful to make sure that all gas bubbles are removed from it before it reaches the set level. Flowing streams are more apt to contain such bubbles, and the venting of the bowl 660 effectively removes them.

Instead of using an electrically energized motor to directly operate the blending valve, the motor can merely operate an air valve that raises the air pressure in a control conduit. This conduit can then be used to control an air-operated blending valve. Because of the greater safety inherent in air operation for valves in a refinery or blending unit, this type of control is very desirable.

It is also desirable to compensate antiknock rating or comparison results in accordance with variations in barometric pressure. This can be accomplished by merely having a recording of the barometric pressure at the time each test is carried out. Barometric pressure recording can be separately made by conventional barographs and any correction applied by separate calculation from the rating results expressed in compression ratio figures, or in the micrometer setting or compression ratio indication of the cylinder which is the value officially listed in the ASTM manual.

As an alternative technique, the air intake for the test engine of the present invention can be arranged to be supplied with air at the standard barometric pressure so that no correction is needed and the rating is then read directly from the compression ratio indicated by the rating indicator of the apparatus. For this purpose the air intake of the test engine is connected to a compartment of fairly limited size, which compartment in turn is open to the outside air pressure through a limited passageway. A barometric switch in the compartment is connected with a damper or the like to throttle down the opening to the outside air pressure whenever the pressure in the compartment rises above standard. The compartment is also in communication with the discharge end of a blower which is actuated to increase the pressure within the compartment when the barometric switch shows that the pressure within the compartment is falling below standard.

When air at standard barometric pressure is used it will be advisable to pressurize the fuel reservoirs and sight glasses to the same degree to prevent discharge of the fuel from vent holes.

The deviation-reducing control of the present invention can have forms other than those referred to above. The deviation can, for example, be computed mechanically as by causing the detonation signals to compress a spring balanced by a second spring which is given a predetermined standard compression, a pole of a double-throw switch being held between the springs so that it trips in a different direction, depending upon which of the spring compressions is the greater one. Magnetic balancing can also be similarly effected.

The various types of apparatus described above can be made resistant to corrosive and other harmful environments as by potting the entire wiring in a chemically resistant resin such as an epoxy resin, or by soldering the wiring with silver solder or similar highly corrosion-resistant compositions.

FIG. 10 shows an automatically self-adjusting apparatus in accordance with the present invention. Here a test engine 10' which can also be of the standard type such as described above for engine 10 in the combination of FIG. 1, has a reversible type electric motor 12' connected to its compression ratio, and another such motor 14' connected to change its fuel-to-air ratio.

As in FIG. 1, a detonation pick-up 16' is provided so as to develop an electrical signal varying in intensity in accordance with the intensity of the detonation or knock that occurs during the operation of the test engine. In the apparatus of FIG. 10 the signals so produced are delivered to an amplifier 18' which can indicate the signal strength on a meter. The amplified signals then go to a sequencer or programmer 20' which controls the engine for the purpose of making a search of compression ratios and fuel-to-air ratios and determining the compression ratio and fuel-to air ratio that produces a maximum knock of standard intensity. The resulting compression ratio is indicated by a compression ratio control slidewire 22' having a slider 24' connected for movement with the compression ratio motor 12'. A clutch 26' can be inserted in the connection between the slider 24' and the motor 12', to enable the slider to be shifted to any desired portion of the slidewire range for any reference compression ratio.

A deviation computer 28' is connected to the control slidewire 22' and operates a control valve 30' to control the flow of alkyllead additive or other antiknock-improving liquid to a gasoline blending stream 32'. The deviation computer can be of the deviation proportion pulse control type and include a set point slidewire 34' as described in the foregoing earlier patent applications, to provide variable-length electrical pulses in lines 31',33'. Instead of having the pulses directly operate the control valve 30', the control valve can be of the more popular pneumatically-operated variety with the pulses supplied to an electric-to-pneumatic signal converter 36' that in turn develops a pneumatic pressure fed to the valve. Suitable electric-to-pneumatic converters, some connected to operate valves, are shown for example in the paper "Electric Actuators: Examination and Evaluation" in the ISA Journal issue of August 1957, pages 326 to 331. The Fisher Governor Co. type 543 electro-pneumatic tranducer is also suitable. The rate of flow of the antiknock-improving liquid can be measured or indicated by a rotameter 38', if desired.

Blending of the antiknock-improving liquid with the gasoline base stock is conveniently carried out with an eductor 40'. A sample line 42' opening into the blend conduit downstream of the eductor withdraws a small amount of the blended product and delivers it to a carburetor bowl 50' for carbureting into the intake fuel line 52' of the test engine. Another bowl 54' can be arranged to supply a standard or reference fuel to have its antiknock characteristics compared with the blended samples, a selector valve 56' enabling either carburetor bowl to be connected to supply the test engine.

Bowl 50' is in the form of a relatively narrow container with a horizontally directed inlet 60' and a horizontally directed outlet 62' in its lower portion. The inlet and outlet are aligned but between them is a baffle 64' that prevents the incoming fuel from flowing directly out without mixing with and displacing the body of fuel in the bowl and also to prevent a ram effect on the carburetor jet because of the relatively high fuel inlet flow-rate.

Through the top 66' of the container there is threadedly received a suction tube 68' connected as by a swivel connector 70' to the intake of a suction pump 72' which can discharge to waste or to the blended gasoline line. Suction tube 68' is connected as by pulley around belt assembly 74' to the fuel-to-air ratio controlling motor 14', so that rotation of the motor will raise or lower the height of the lower end of the tube. The walls of container 50' are advantageously transparent so that its contacts can be observed. The outlet of pump 72' can also have a pressure-operated switch that warns when the pump is not operating. A very effective configuration of container is cylindrical with a diameter of nine-sixteenths inches and an overall height of five inches such as the standard ASTM engine carburetor sight glass and body. A sample flow of 300 to 500 milliliters per minute through such a container gives very effective sampling.

In operation the apparatus of FIG. 10 has its deviation computer set as by adjustment of a set point slidewire wiper 76' it contains, to correspond to the position of the control slidewire 22' representing the compression ratio that gives the standard knock intensity when the engine is fed with the standard or reference fuel at the fuel-to-air ratio producing maximum knock. The engine is then supplied with the blended fuel and the sequencer effects variations of compression ratio and fuel-to-air ratio until under maximum knock conditions the compression ratio produces a knock of standard intensity. The sequencer then actuates the cycle timer 78' of the computer 28' which in turn determines the difference between the control slidewire, representing the compression ratio for the blend, and the set point slidewire, representing the compression ratio for the standard or reference fuel. If there is a difference an appropriate pulse is delivered to adjust the control valve in the compensatory direction. If there is no difference, indicating that the blend has the desired antiknock value, no compensating pulses are generated.

The sequencer of FIG. 10 can be identical to that illustrated in FIG. 3, or it can be in the form shown in FIG. 11 which is generally similar and has its corresponding parts similarly numbered. The construction of FIG. 11 has a twelve-position rotary stepping switch assembly 112' operated by a stepping solenoid 114' from the dc output of rectifier 150'. The rotary switch has seven decks and is shown in the position from which it starts a sequence cycle of clockwise steps. Decks 1' and 2' are interrelated, steps 1 through 6 being on deck 1' and steps 7 through 12 on deck 2'. The switch is brought to the illustrated position by operating start switch 200', shown in non-operated condition, and holding that switch operated until the rotary switch finishes stepping. The solenoid power circuit through contacts 201' of switch 200' and step 1 contact of deck 1' is then interrupted. In this condition the winding of relay 160' is energized through ac bus 151' and step 1 of contact of deck 5', and shifts its armatures away from the de-energized position shown. This relay is energized without delay but upon de-energization does not return to the illustated position until the expiration of a pre-set time delay which can be 35 to 40 seconds or thereabouts.

As soon as the start switch 200' is released, it returns to the illustrated condition and its lower contacts 202' complete a solenoid energizing circuit through step 2 contact of deck 1', step 1 contact of deck 4', upper armature 163' of relay 160', step contact of deck 3' and return lead 199'. The stepping switch then steps to the next or initial compression ratio search position.

In the compression ratio search position pulses are delivered from control device 90' to the decrease or increase pulse output lines 351', 353' to bring the compression ratio of the test engine to the point that produces knock of standard intensity. A pulse is supplied to line 354' whenever there is either an increase or decrease pulse, and thus re-energizes relay 160' momentarily so that it must restart its time delay cycle. Energizing lead 352' connected from steps 2 and 6 of deck 5' to the control device terminals supplies the current that is pulsed when needed, so that no pulses can be delivered by the control device when the stepping switch 112' is in other positions. In addition a time constant reducing control is also supplied with pulses either from line 354' or as shown through relay 198' so that a long pulse either of the decrease or increase type will reduce the time constant in the detonation amplification circuit, as explained supra. A varistor 197' can be connected across the winding of relay 198' to protect the time constant reducing circuit from excessive peak inverse voltage.

When the test engine knock reaches standard intensity no further compression ratio change pulses are produced and relay 160' will time out, returning its armature 163' to the illustrated position. This closes a solenoid stepping circuit through step 3 contact of deck 1', armature 163', contacts 202', step 2 contact of deck 3' and return lead 199', bringing the stepping switch to the next or mixture-leaning position.

In the mixture-leaning position deck 5' connects an energizing circuit through its step 3 contact to the down winding of the carburetor motor 14'. This circuit is completed through switch 193' which is closed whenever the liquid level in the engine carburetor is within the range prescribed by the ASTM Research and Motor methods.

After some lowering of the fuel level of the low knock intensity switch 101' closes. This establishes another solenoid stepping circuit through step 4 contact of deck 1', switch 101', step contact 3 of deck 3', and return lead 199'. Rotary switch 112' thereupon steps to the next or mixture-enriching position. In the mixture-enrichening position the carburetor liquid level is raised by two phases of operation. Continuous raising of the level occurs first by energizing the up-winding of the carburetor motor 14' through deck 5' and its step 4 contact, lead 184', normally closed delayed opening thermal switch 179', lead 186' and deck 7'. At the same time the winding of relay 170' is energized from line 186', motor operated cycling switch 180' has its cycling initiated and normally open delayed closing thermal switch 178' heater element is energized so that its contacts will close in about five seconds.

Switch 179' remains closed for a short period, typically 20 to 30 seconds, after which it opens, the carburetor motor stops raising the fuel level and relay 170' is de-energized. Like relay 160', relay 170' energizes without delay but upon de-energization of a pre-set time delay which can be 40–45 seconds or thereabouts. The continuous elevating action of the carburetor motor has caused the maximum knock switch 250' to be under the control of the knock intensity signal which has begun to increase as the air-fuel mixture richened.

The up-winding of the carburetor motor in this second phase of operation is under the control of the maximum knock switch as described in connection with FIG. 3, which switch is in series with the cycling switch 180' that alternates 2 seconds closed and 8 seconds open, for example.

The carburetor liquid level is accordingly further raised in intermittent steps until knock intensity stops increasing and the maximum knock switch opens to show that the fuel level for maximum knock has been reached. Each time the fuel level is raised through the action of switches 180' and 250' relay 170' is momentarily re-energized so that it must restart its time delay cycle preventing it from timing out before maximum knock fuel level is established.

After maximum knock is reached and switch 250' opens, relay 170' times out, returning its contacts 171' to the closed position. Before thermal switch 178' cools off enough to open, the stepping switch 112' is stepped twice by a solenoid energizing circuit through step 6 terminal of deck 1', lead 191', thermal switch 178', contacts 171', step 4 and step 5 terminals of deck 3', and return lead 199'. As the rotary switch goes through the first of these two steps, deck 5' through its step 5 terminal enerizges the winding of relay 160' so that after the second of these two steps the equipment is ready for a final compression ratio search.

The final compression ratio search is just like the initial search except that at its termination the closing of relay contacts 162' causes the rotary switch to step three times. This is effected by a solenoid energizing circuit through step 9 of terminal deck 2', contacts 162', step 6, 7 and 8 terminals of deck 3', and return lead 199'.

Lights L1', L2', L3', L4' and L5' are lit through deck 6' and step-down transformer 196' if desired, to indicate the four engine control positions and the completion of the test cycle. Light L5' can also be in parallel with the cycle timer of the computer 28' of FIG. 10 to effect automatic adjustment of the blending valve. Also in parallel with light L5' there can be placed a delay solenoid (not shown) connected to operate start switch 200' so as to begin another test cycle after a few seconds delay that allows for the completion of any needed adjustment of the blending valve. The parallel circuitry described above could also be connected from a suitably positioned contact on deck 5'.

It is not necessary to rely solely on compression ratio changes for controlling the blending. Changes in knock intensity at a fixed compression ratio can be used instead. When the blending does not materially affect the fuel-to-air ratio required for maximum knock, the knock intensity can be measured at a fixed fuel-to-air ratio and variation of knock intensity used to make compensatory changes in the blending. Alternatively, where a fixed fuel-to-air ratio is suitable changes in compression ratio can be used to control the blending but these changes can be measured in a single compression ratio search. One of the compression ratio search steps and all the fuel-to-air mixture searches can then be eliminated from the testing sequence of FIGS. 10 and 11 to greatly simplify the apparatus and shorten the test and control lag time.

Figure 12:
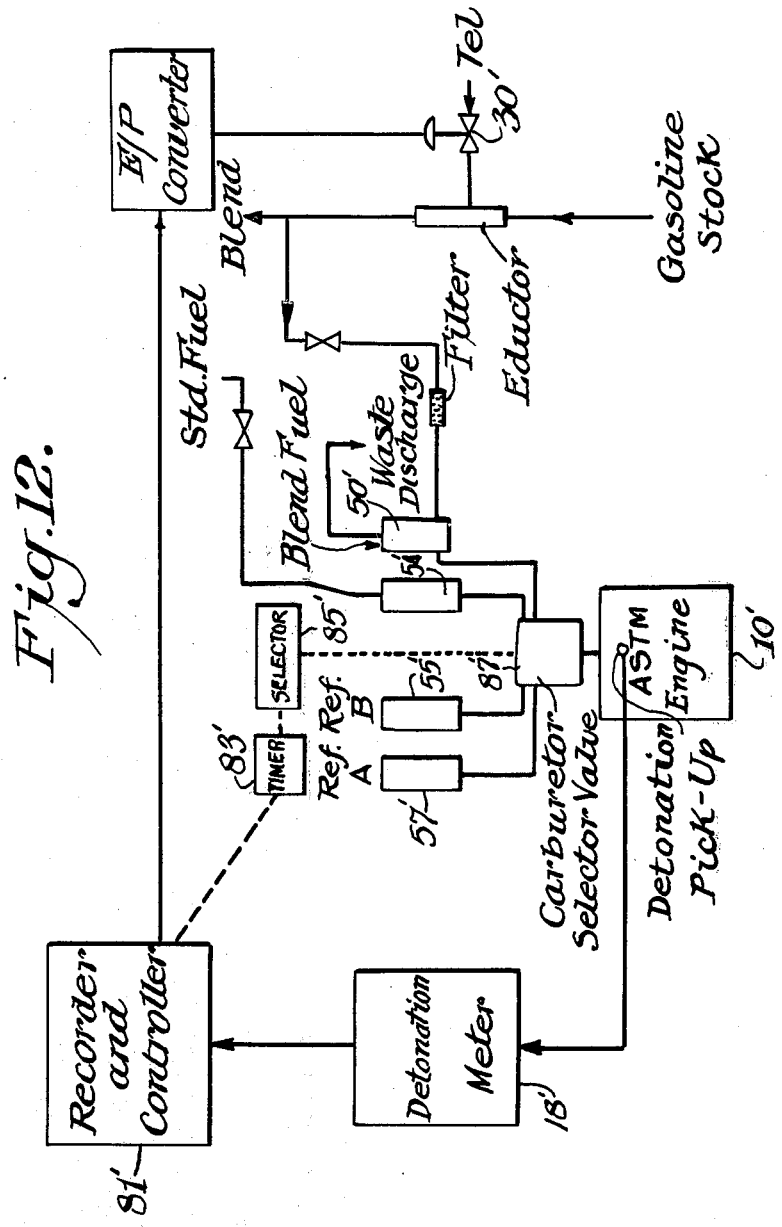

FIG. 12 illustrates an arrangement for automatically controlling blending by knock intensity measurements alone. The test engine 10' here has its detonation meter 18' directly connected to a recorder and controller 81', the controller portion of which can be identical with the computer 28' of FIG. 10. The generation of comparison and correction pulses by the controller can in turn be controlled by a timer 83' that also controls a selector connected to rotate carburetor selector valve 87' to different carburetor bowls 50', 54', 55' and 57'. Bowl 50' supplies samples of the blended fuel, as in the construction of FIG. 10, and bowl 54' supplies standard fuel to be matched by the blending. Bowls 55' and 57' supply reference fuels such as blends of pure 2,2,4-trimethyl pentane (isooctane) with n-heptane or tetraethyllead.

The timer 83' is arranged to connect the controller for operating blending valve 30' when the selector connects the engine carburetor to the blending sample bowl 50'. The operation of the valve may be direct where the valve is actuated by an electric motor or through an electric-to-pneumatic converter as in FIG. 10, where the valve is pneumatically actuated.

The timer 83' can be arranged to regularly shift the carburetor selector valve to bowls 54', 55' and 57', at which times it disconnects the controller from the blending valve. At those times when bowl 54' is used the recorder merely makes a record of the knock intensities measured. When bowl 55' or bowl 57' is in use the controller is connected to re-evaluate and if necessary adjust its own set point. The reference fuels in bowls 55' and 57' can be utilized at their fuel-to-air mixture ratio corresponding to maximum knock, as by presetting the respective fuel or bowl levels, to give knock intensities which can be used as checks for the standard fuel and/or the blended fuel, particularly when the knock intensities of the reference fuels bracket the desired knock intensity.

Instead of having a purely electrical arrangement for balancing a control element with a set point, it can be made partially or completely mechanical, pneumatic, hydraulic, magnetic, or of any other form.

Figure 13:
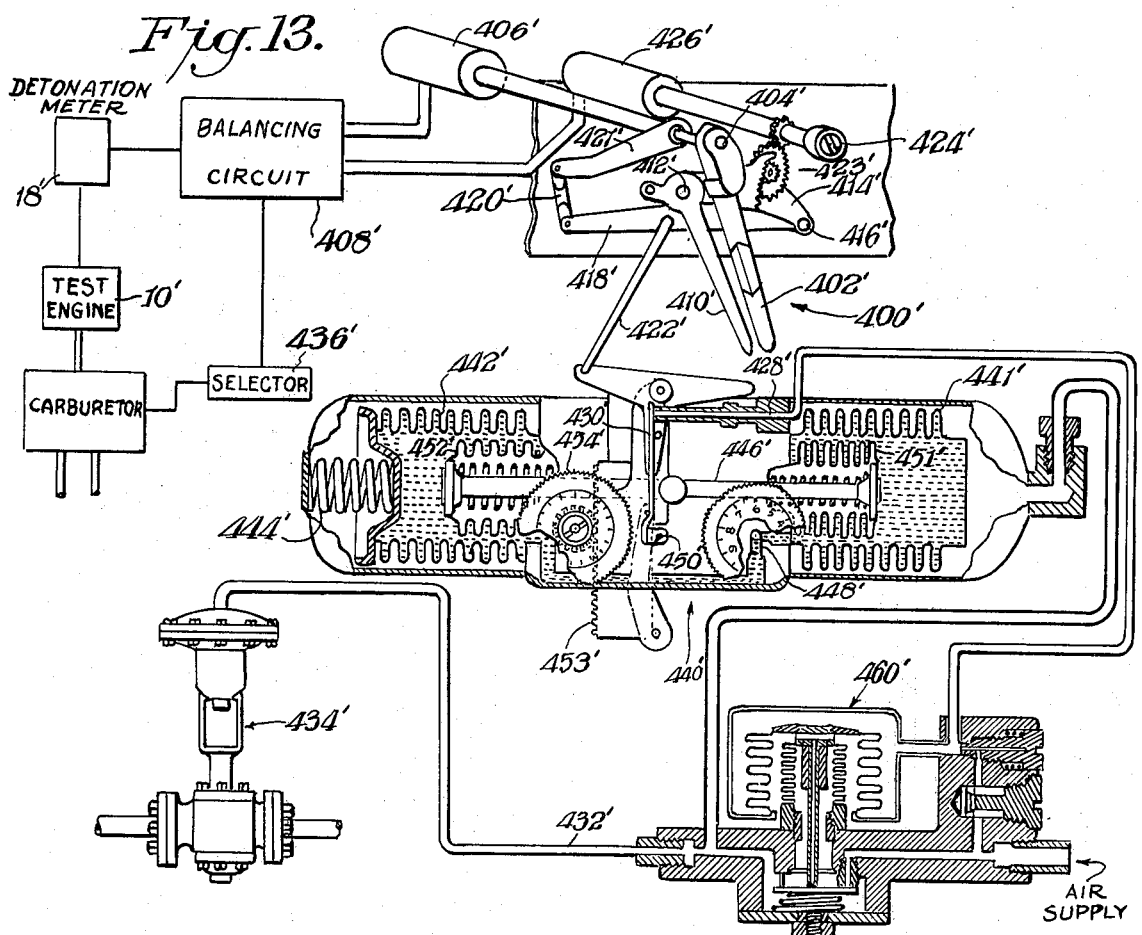

The construction of FIG. 13 has a mechanical comparison and differential computer indicated generally at 400'. This can be of the usual type such as that described in pages 42 and 43 of Minneapolis-Honeywell Regulator Co. Catalog C15-2, copyright 1957 by that company. It has a pen-carrying indicator arm 402' journaled at 404' and rotated around that journal by a balancing motor 406' that receives electrical balancing signals from a balancing circuit 408' of any suitable type such as those shown and described on pages 6 and 7 of the above-identified catalog to which reference can be made for a more complete description. Suffice it to say that the balancing circuit can take a dc voltage such as supplied by the detonation meter 18' of an ASTM test engine 10', measure its difference from a standard voltage, convert that difference to an ac power output having an intensity that varies in accordance with the measured dc difference, and supply that power output to one winding of a variable speed reversing induction motor. A standard ac power supply in synchronism with the foregoing variable power ac supply is delivered to the reverse winding of the motor. Variation in the intensity of the variable power supply with respect to the standard ac supply will then cause the motor 406' to turn in one direction or the other.

A set point index arm 410' is pivoted at 412' and is secured to a plate 414' which in turn carries a pivot 416' supporting one end of a differential lever 418'. A differential link 420' interconnects the other end of the differencial lever with the corresponding end of an indicator lever 421' that rotates about journal 404' with the indicator arm 402'.

A control link 422' connected to the differential lever 418' is so arranged that when both the indicator arm 402' and the set point arm 410' are rotated together around their pivots, the control link does not move. However when one of these arms moves with respect to the other, the control link 422' is pulled up or pushed down.

The set point arm 410' is made adjustably positionable by a knob 424' which through a gear train tilts the plate 414' about its pivot 412' and in this way raises or lowers the pivot 416' for the differential lever. Inasmuch as set point arm 410' tilts with plate 414', the set point position is also changed. The plate as illustrated has a sector gear or rack 423' in a different plane than that in which it is pivoted at 416', but other constructions can also be used. A second balancing motor 426' is shown as connected to automatically operate set point adjustment under the control of the balancing circuit 408'. With such motor control of the set point, the knob 424' can be eliminated if desired.

Movements of the congrol link 422' are translated into variations in air pressure in an air line 428', by transmitting this motion to a movable flapper 430' located very close to the mouth of the line. The resulting changes in pressure are amplified by a pilot valve 460' into larger changes in the principal air line 432' which operates a pneumatic valve 434' to adjust the blending.

By supplying the test engine 10' in the construction of FIG. 13 with samples of blended fuel, variations in knock intensity can be used to control changes in the amount of antiknock fluid or the like blended into the fuel. Intermittent or continuous operation of the balancing motor 406' by circuit 408' can then be effected with a selector 436', for example, so arranged to periodically shift the test engine fuel supply to a standard fuel, at the same time switching the operation of the balancing circuit 408' so that it controls balancing motor 426' instead of balancing motor 406'. This will enable adjustment of the set point arm 410' so that it properly indicates the position from which the indicator arm 402' is to show departures.

To increase stability and reduce hunting, the apparatus of FIG. 13 also includes a stabilizing assembly 440' that has a pair of large liquid-filled bellows 441', 442' with the exterior of bellows 441' exposed to the control pressure in line 432'. The second bellows 442' is under the compressive effect of a mechanical spring 444'. Within the foregoing bellows are smaller bellows 451', 452' respectively each secured to the opposite end of a balancing rod 446' that is connected to move the flapper support. The liquids within the large bellows and around the small bellows have a transfer conduit 448' with a controllable aperture to gradually equalize the pressures in the respective large bellows.

Any change in control pressure in line 432' will accordingly not only tend to restore control arm 402' to the position of the set point arm, but will slowly cause a shifting of the flapper 430' with respect to nozzle 428' so that the changed control pressure tends to maintain itself.

The flapper can also be arranged to have its pivot 450' moved toward or away from the nozzle 428' so as to vary the range of pressure change caused by movements of the control link. To this end the flapper pivot is shown as carried on a block 453' that can be raised or lowered as by a rack and pinion gear operated by dial 454'.

The entire stabilizing assembly 440' can be omitted, if desired, and hunting controlled by other techniques such as delaying changes in control pressure for a time that permits previous changes to take full effect on the blending. Inasmuch as the measuring lag may be as much as 8 or 10 minutes or somewhat more where a full antiknock search sequence is used, the sampling of fuel may be made at corresponding intervals.

Figure 14:
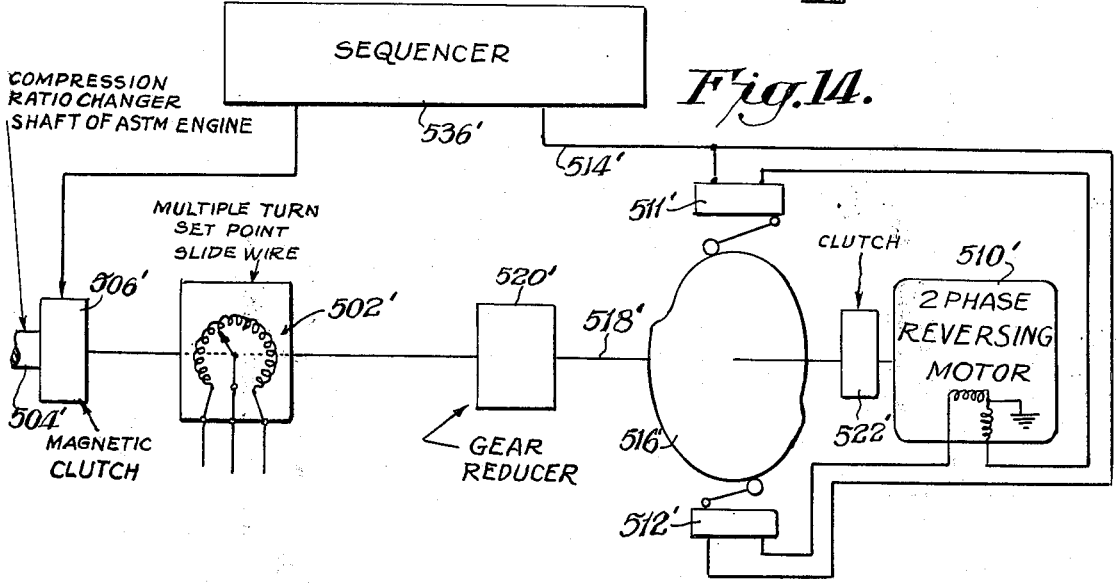

In order to make sure that gradual drifting of the test engine or the like will not cause the index arm 410' or corresponding set point slidewire settings to reach a limit of their travel and therefore be unusable, the automatic apparatus of the present invention can also be provided with self-centering mechanism. One such structure is shown in FIG. 14, where a set point slidewire 502' is connected for resetting as by shaft 504' of the compression ratio motor for the ASTM engine. The resetting is controlled by a magnetic clutch 506' energized at the proper times by sequencer 536' that can operate in the manner described for the selector 436' in the construction of FIG. 13.

Automatic centering is arranged by providing a twophase reversing motor 510' with its opposite windings each connected in series through separate switches 511', 512' to a power supply lead 514' from the sequencer. A centering cam 516' is connected for rotation by a shaft 518' connecting it to setpoint slidewire 502' and the reversing motor, the cam having high and low lobes coacting with switches 511', 512' so that the reversing motor is rotated in one direction or the other until the centering cam is brought to the position at which both switches are open. The cam lobes are so arranged that both switches are open only when the cam is in the slidewire centering position.

Where the slidewire 502' is of the multiple turn variety a gear reducer 520' can be connected between the slidewire and the centering cam and arranged so that one turn of the cam corresponds to the movement of the set point over the entire range of travel along the slidewire. An auxiliary clutch 522' can also be provided for the reversing 510' to disconnect the twophase motor during operation of the slidewire 502' by the compression ratio motor.

Instead of having a centering mechanism for the set point element and having that element automatically controlled, the set point element can merely be in the form of a member fixed at a predetermined value setting. Such setting can for example be the mid-point or other convenient point of the control indicator such as the control slidewire or control arm.

FIG. 15 illustrates this type of operation. The apparatus here shown is of the knock-instensity control arrangement, as is the apparatus of FIG. 12. It has a test engine 10' with a fuel selector valve 56' and a detonation meter 18' connected to operate the arm 24' of a control slidewire 22' through a remotely controllable clutch 626'. A set point slidewire 34' is balanced against the control slidewire, and connected to increase and decrease pulsers under the influence of cycle timer 78', as in FIG. 10. The outputs of the pulsers are fed through switches 635', 637' that shift their pulses between a blend valve control 636' and a slidewire equalizer 639'. A second clutch 627', also remotely controllable, selectively connects the equalizer to the control slidewire arm 24'.

Sequencer 620' is arranged to operate fuel selector 56', clutches 626', 627', cycle timer 78', and switches 635', 637'. The apparatus can be placed in operation as by setting the tap of set point slidewire 34' at its midpoint, and then causing the sequencer to select a reference fuel, disengage clutch 626', engage clutch 627', and shift switches 635', 637' to their equalizer contacts. A few minutes running of the test engine will then produce a steady detonation meter signal while periodic cycle timer operation causes the equalizer, which need be nothing more than a reversing motor as in the construction of FIG. 14, to bring the control slidewire arm 24' to its mid-point postion. To make sure the detonation meter is operated in an appropriate range, the test engine can have its compression ratio and fuel-to-air ratio manually or automatically adjusted.

The sequencer then operates the fuel selector to deliver blend fuel to the test engine while clutch 626' is engaged, clutch 627' disengaged, and switches 635', 637' shifted to their blend valve control terminals. Continued operation of the test engine then causes the blending valve to so control blending as to keep the detonation meter output at a value that holds control slidewire arm 24' at its mid-point. After a period of such blending control that can range from 10 minutes to an hour or more, the sequencer shifts back to standard reference fuel and restores the control slidewire arm to its mid-point. Such restoration will involve no slidewire movement unless the test engine characteristics have changed, as by build-up of combustion chamber deposits, so that the detonation meter signal level is shifted from where it should have been to properly indicate the antiknock rating of the blended fuel. Where such deposit build-up causes higher knock intensities, the apparatus can automatically increase the antiknock rating of the blended fuel even though no such increase is needed. However the periodic equalizing of the control slidewire arm will compensate for the changed output of the detonation meter and assure proper blending. Either the fixed or controllable set point arrangements can be used with any of the automatic controls, whether of the compression ratio type as in FIG. 10, or the knock intensity type as in FIG. 12.

The blending apparatus of the invention can also have warning devices such as a bell that sounds to indicate that knock intensities are getting severe enough to endanger engine operation, or are getting too faint to be useful. It is in fact preferred to shut down the apparatus and correct the cause of drift before they reach such extremes. The apparatus can also have automatic compression ratio searching, as in the construction of FIG. 10, to thereby automatically compensate for some of the possible drift in the engine operation conditions.

A warning arrangement can also be provided to indicate when a blend ingredient supply is called for at a rate too high for proper operation. For example there is usually a ceiling on the maximum amount of antiknock compound permitted in a fuel and the warning device can be connected to call attention to a valve position that reaches or exceeds such maximum. A similar warning can indicate when there is a material drop in pressure in a blend ingredient line controlled by an automatically operated valve, indicating that the flow through that line is not being properly controlled by the valve. A similar warning arrangement can indicate when a controlled valve is completely closed.

Instead of having analog signal systems, the blending control can operate with digital signals, as for example pulses or alternating currents generated at repetition rates or frequencies that vary in accordance with compression ratio or knock intensity measurements and are compared with a standard such as the omnipresent 60 cycle power system. Differences between the signal frequency and the standard frequency can then operate the blending controls.

Sampling of fuel for the blending control arrangement that uses the compression ratio measuring system (as in FIG. 10) need not be maintained at all times at the rapid flow rate, but can be intermittent. For this purpose a limiting valve can be inserted in the sampling conduit 42' and it can be automatically opened wide by the sequencer 20' whenever a compression ratio determining sequence is completed. Before completions the limiting valve can be closed to a position that barely allows sufficient flow to operate the engine and keep the fuel level in the carburetor from dropping.

The knock intensity control system (as in FIG. 12) gives much faster control and is better used with a rapid sampling flow.

The compression ratio control arrangement can also be operated with fuel mixture test excursions carried out only once in every two, three, four or more measuring cycles. Indeed, when the fuel is sufficiently uniform to have no significant change in the mixture ratio that provides maximum knock, these test excursions can be entirely eliminated.

It is a feature of the present invention that the automatic blending of alkyllead compounds like tetraethyllead into refinery gasoline streams seems to use the antiknock values of the alkylleads somewhat more economically than prior art non-automatic systems. Tests have shown that the automatic system requires about 2/10 of a gram of tetraethyllead less per gallon to reach specification octane numbers.

The automatic blending of the present invention also effects a highly accurate and closely reproducible blending operation. In general, the compression ratio control system such as illustrated in FIGS. 10 and 11, produces a blended product having a research octane number within ±0.3 of any predetermined value. The knock intensity control system, as in FIG. 14, maintains a blending to within about ±0.2 of a research octane number.

Obviously many modifications and variations of the present invention are possible in the light of the above teachings. It is, therefore, to be understood that within the scope of the appended claims the invention may be practiced otherwise than as specifically described.

What is claimed is:

1. In the process of in-line blending of liquid fuel, the improvement according to which the moving stream of blended fuel has its knock characteristics monitored by continuously operating a knock testing engine on a small sample stream of said fuel and on a reference fuel so as to cause knocking of the engine, automatically switching the supply of said fuels to the engine for such operation so that the engine operates alternately on the respective fuels, continously flowing the sample stream through a level-determining carburetor so that it is carburetted into the engine from a predetermined hydrostatic head, generating from the engine a signal indicative of the relative knock characteristics of the sample fuel, and continuing the flow of the sample stream to the carburetor while the engine is operating on the reference fuel.

2. The combination of claim 1 in which the flow of reference fuel is stopped while the engine is operating on the sample stream.

3. The combination of claim 1 in which the fuels are cooled as they move to the engine.

4. The combination of claim 1 in which the generated signal is used to control the blending.

5. A fuel monitoring apparatus for in-line blending of liquid fuel, said apparatus comprising a knock testing engine having a carburetor that includes level-determining means, a continuous-flow sample conduit for receiving a sample stream of fuel from the in-line blending and uninterruptedly delivering that stream to the level-determining means, reference supply means connected for delivering to the carburetor a stream of reference fuel, automatic sequencing means connected to the conduit and to the reference supply means to automatically alternate the supply of fuel to the engine between the sample stream and the reference stream, and indicating means connected to the engine to show the knock characteristic of the fuel on which it operates.

6. The combination of claim 5 in which the level-determining means is a flow-through container into which fuel flows until it reaches a predetermined level and excess fuel flow received subsequently and tending to overflow that level is diverted away from the engine.

7. The combination of claim 5 in which the carburetor includes a rotating plug valve through which it delivers fuel to the engine from selectable sources.

* * * * *

UNITED STATES PATENT AND TRADEMARK OFFICE
CERTIFICATE OF CORRECTION

PATENT NO. : U.S. 3,913,380
DATED : October 21, 1975
INVENTOR(S) : John T. Jones, William C. Ludt and Hudson W. Kellogg It is certified that error appears in the above-identified patent and that said Letters Patent are hereby corrected as shown below:

On the title page of patent, after /75/ the addresses of the inventors should be stated as: John T. Jones, Ardsley, New York; William C. Ludt, Princeton, New Jersey, and Hudson W. Kellogg, Dobbs Ferry, New York.
Column 1, line 58, "which" should read -- such --. Column 4, line 26, "(2,3,4-" should read -- (2,2,4- --. Column 10, line 18, "opeating" should read -- operating --; line 45, "223" should read -- 233 --. Column 14, line 25, "lower" should read -- lowest --. Column 19, line 51, "off" should read -- of --. Column 24, line 16, "tranducer" should read -- transducer --; line 51, "contacts" should read -- contents --. Column 26, line 13, delete "of" (second occurrence). Column 28, line 65, "congrol" should read -- control --. Column 30, line 17, insert "motor" before "510'".

Signed and Sealed this thirteenth Day of April 1976

[SEAL]

Attest:

RUTH C. MASON
Attesting Officer

C. MARSHALL DANN
Commissioner of Patents and Trademarks